US012666408B2

(12) United States Patent
Ji et al.

(10) Patent No.: US 12,666,408 B2
(45) Date of Patent: **\*Jun. 23, 2026**

(54) RESOURCE INDICATION METHOD AND APPARATUS AND COMMUNICATION SYSTEM

(71) Applicant: 1FINITY Inc., Kawasaki (JP)

(72) Inventors: Pengyu Ji, Beijing (CN); Jian Zhang, Beijing (CN); Guorong Li, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 59 days.

This patent is subject to a terminal disclaimer.

(21) Appl. No.: 18/631,671

(22) Filed: Apr. 10, 2024

(65) Prior Publication Data

US 2024/0260013 A1    Aug. 1, 2024

Related U.S. Application Data

(63) Continuation of application No. 17/237,122, filed on Apr. 22, 2021, now Pat. No. 11,997,655, which is a
(Continued)

(51) Int. Cl.
*H04W 72/0446*        (2023.01)
*H04W 72/23*          (2023.01)

(52) U.S. Cl.
CPC ........ *H04W 72/0446* (2013.01); *H04W 72/23* (2023.01)

(58) Field of Classification Search
CPC . H04W 72/0446; H04W 72/23; H04W 72/25; H04W 4/40; H04W 72/232;
(Continued)

(56) References Cited

U.S. PATENT DOCUMENTS

2014/0247759 A1    9/2014    Zhang et al.
2015/0341927 A1    11/2015    Wei et al.
(Continued)

FOREIGN PATENT DOCUMENTS

CN        104938016 A        9/2015
CN        107733496 A        2/2018
(Continued)

OTHER PUBLICATIONS

Notice of Preliminary Rejection issued by the Korean Intellectual Property Office for corresponding Korean Patent Application No. 10-2021-7012419, mailed on Apr. 5, 2024, with an English translation.
(Continued)

*Primary Examiner* — Rownak Islam
(74) *Attorney, Agent, or Firm* — Myers Wolin, LLC

(57)        ABSTRACT

A resource indication method and apparatus and communication system. The resource indication method includes: receiving by a terminal equipment third indication information used for dynamically indicating time domain resources in a resource pool transmitted by a network device, and/or receiving by a terminal equipment first indication information used for indicating first time domain resources belonging to a resource pool and transmitted by a network device. By indicating by the indication information which time-domain resources in the semi-persistently configured and/or dynamically configured time-domain resources may be contained in the resource pool, the V2X terminal equipment may perform data transceiving by using the resources in the resource pool, thereby supporting V2X communication in a future communication system.

6 Claims, 11 Drawing Sheets

Related U.S. Application Data continuation of application No. PCT/CN2018/113481, filed on Nov. 1, 2018.

(58) Field of Classification Search
CPC .... H04W 92/18; H04L 5/0044; H04L 5/0094; H04L 5/1469
USPC ......................................................... 370/329
See application file for complete search history.

(56) References Cited

U.S. PATENT DOCUMENTS

| | | | |
|---|---|---|---|
| 2016/0205683 | A1 | 7/2016 | Quan et al. |
| 2017/0289733 | A1 | 10/2017 | Rajagopal et al. |
| 2018/0098322 | A1* | 4/2018 | Yoon ..................... H04W 72/23 |
| 2018/0124815 | A1 | 5/2018 | Papasakellariou |
| 2018/0219654 | A1 | 8/2018 | Chen et al. |
| 2018/0309513 | A1 | 10/2018 | Kim et al. |
| 2019/0045490 | A1* | 2/2019 | Davydov .............. H04L 5/0053 |
| 2019/0173607 | A1 | 6/2019 | Liu |
| 2021/0014843 | A1* | 1/2021 | Wang ...................... H04W 4/40 |
| 2022/0046615 | A1 | 2/2022 | Park et al. |

FOREIGN PATENT DOCUMENTS

| | | |
|---|---|---|
| CN | 107889251 A | 4/2018 |
| CN | 108683485 A | 10/2018 |
| CN | 111165036 A | 5/2020 |
| WO | 2015/042771 A1 | 4/2015 |
| WO | 2017/117991 A1 | 7/2017 |
| WO | 2019/201165 A1 | 10/2019 |

OTHER PUBLICATIONS

NTT Docomo, Inc., "Resource allocation mechanism", Agenda Item: 7.2.4.1.4, 3GPP TSG-RAN WG1 Meeting #94, R1-1809159, Gothenburg, Sweden, Aug. 20-24, 2018.

International Search Report and Written Opinion of the International Searching Authority by the State Intellectual Property Office of the P. R. China for corresponding International Patent Application No. PCT/CN2018/113481, mailed on May 27, 2019, with English translation.

Extended European search report with the supplementary European search report and the European search opinion issued by the European Patent Office for corresponding European Patent Application No. 18938348.2-1215, mailed on Oct. 21, 2021.

Examination Report issued by the Patent Office of India for corresponding Indian Patent Application No. 202137017438, mailed on Feb. 24, 2022, with an English translation.

Notice of Reasons for Refusal issued by the Japan Patent Office for corresponding Japanese Patent Application No. 2021-522443, mailed on May 17, 2022, with an English translation.

Fujitsu, "Considerations on sidelink physical layer structures", Agenda Item: 7.2.4.1.2, 3GPP TSG-RAN WG1 Meeting #94bis, R1-1810590, Chengdu, China, Oct. 8-12, 2018.

Samsung, "CR to 38.213 capturing the RAN1 #94bis meeting agreements", Change Request, 38.213, CR Draft rev—Current Version: 15.3.0, 3GPP TSG-RAN WG1 Meeting #94bis, R1-1812092, Chengdu, China, Oct. 8-12, 2018.

Spreadtrum Communications, "Discussion on sidelink physical layer structures and procedure(s)", Agenda Item: 7.2.4.1.2, 3GPP TSG-RAN WG1 Meeting #94bis, R1-1811010, Chengdu, China, Oct. 8-12, 2018.

First Notification of Office Action and Search Report issued by the China National Intellectual Property Administration for corresponding Chinese Patent Application No. 201880098955.1, mailed on Sep. 7, 2023, with an English translation.

Communication pursuant to Article 94(3) EPC issued by the European Patent Office for corresponding European Patent Application No. 18 938 348.2, mailed on Jan. 18, 2024.

LG Electronics, "Discussion on LTE and NR Uu enhancements to control NR sidelink", Agenda Item: 7.2.4.3.1, 3GPP TSG-RAN WG1 Meeting #94, R1-1808525, Gothenburg, Sweden, Aug. 20-24, 2018.

ZTE, "Discussion on NR Sidelink Physical resource pool allocation", Agenda Item: 7.2.4.1.4, 3GPP TSG-RAN WG1 Meeting #94, R1-1808605, Gothenburg, Sweden, Aug. 20-24, 2018.

Second Notification of Office Action and Search Report issued by the China National Intellectual Property Administration for corresponding Chinese Patent Application No. 201880098955.1, mailed on Mar. 30, 2024, with an English translation.

Non-Final Office Action issued by the United States Patent and Trademark Office for corresponding U.S. Appl. No. 17/237,122, electronically delivered on Aug. 17, 2023.

Notice of Allowance issued by the United States Patent and Trademark Office for corresponding U.S. Appl. No. 17/237,122, electronically delivered on Jan. 10, 2024.

* cited by examiner

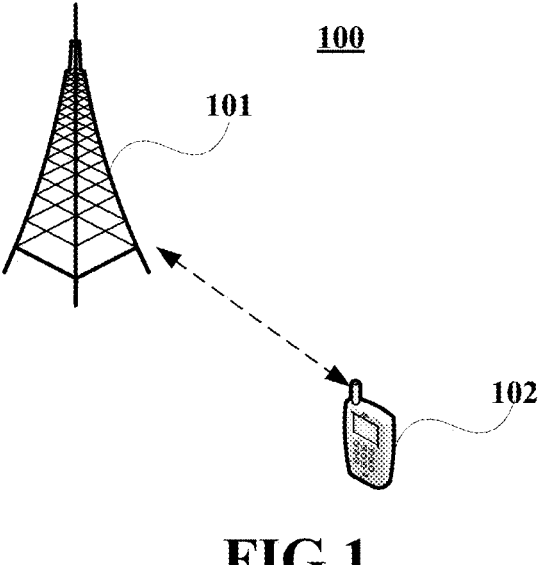

A terminal equipment receives, first indication information used for indicating first time domain resources belonging to a resource pool and transmitted by a network device

202

The terminal equipment receives, second indication information used for dynamically indicating second time domain resources belonging to the resource pool and transmitted by the network device

203 the terminal equipment transceives data by using the first time domain resources and/or the second time domain resources in the resource pool

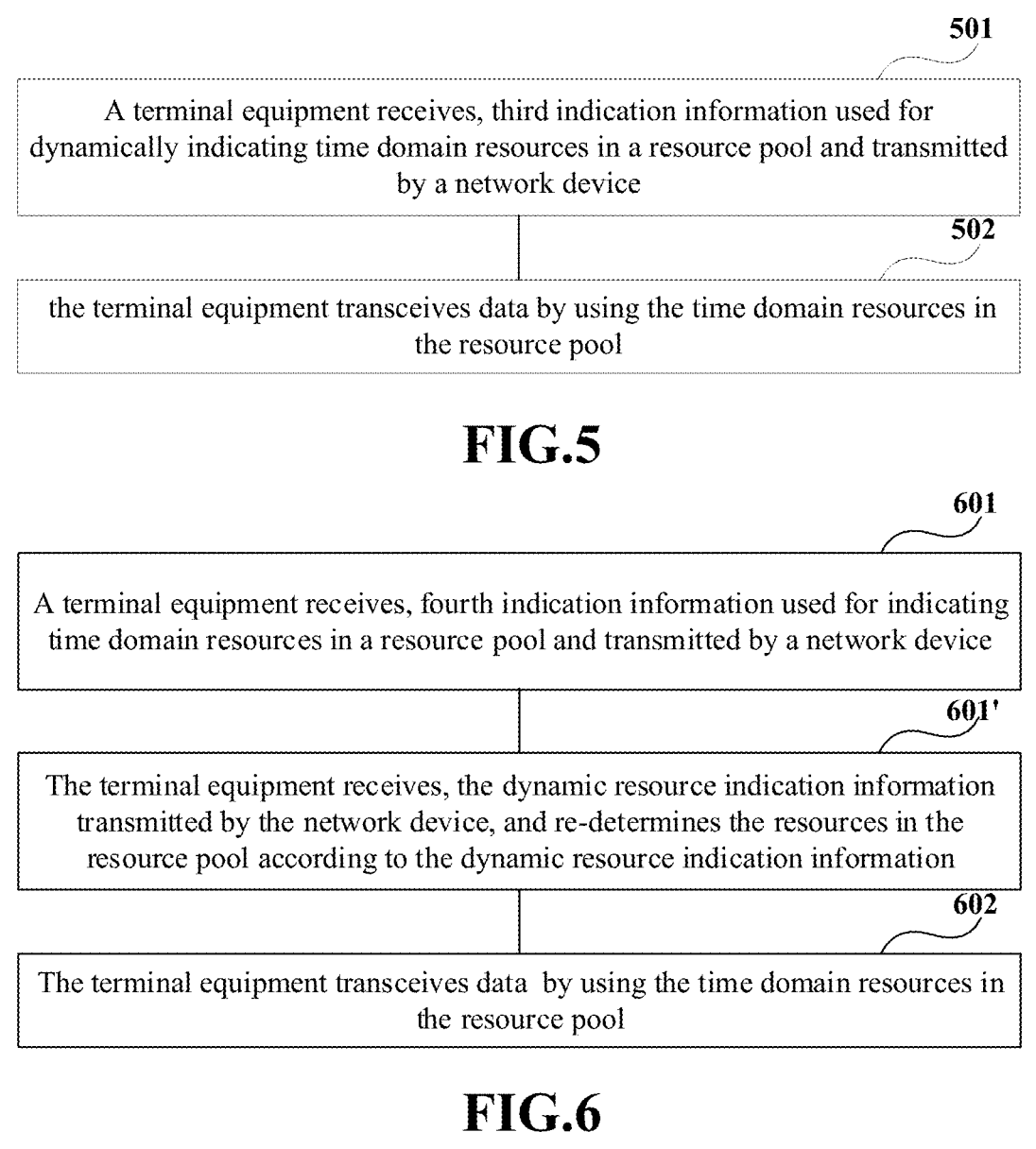

A terminal equipment receives, third indication information used for dynamically indicating time domain resources in a resource pool and transmitted by a network device

502 the terminal equipment transceives data by using the time domain resources in the resource pool

A terminal equipment receives, fourth indication information used for indicating time domain resources in a resource pool and transmitted by a network device

601'

The terminal equipment receives, the dynamic resource indication information transmitted by the network device, and re-determines the resources in the resource pool according to the dynamic resource indication information

602

The terminal equipment transceives data by using the time domain resources in the resource pool

FIG.6

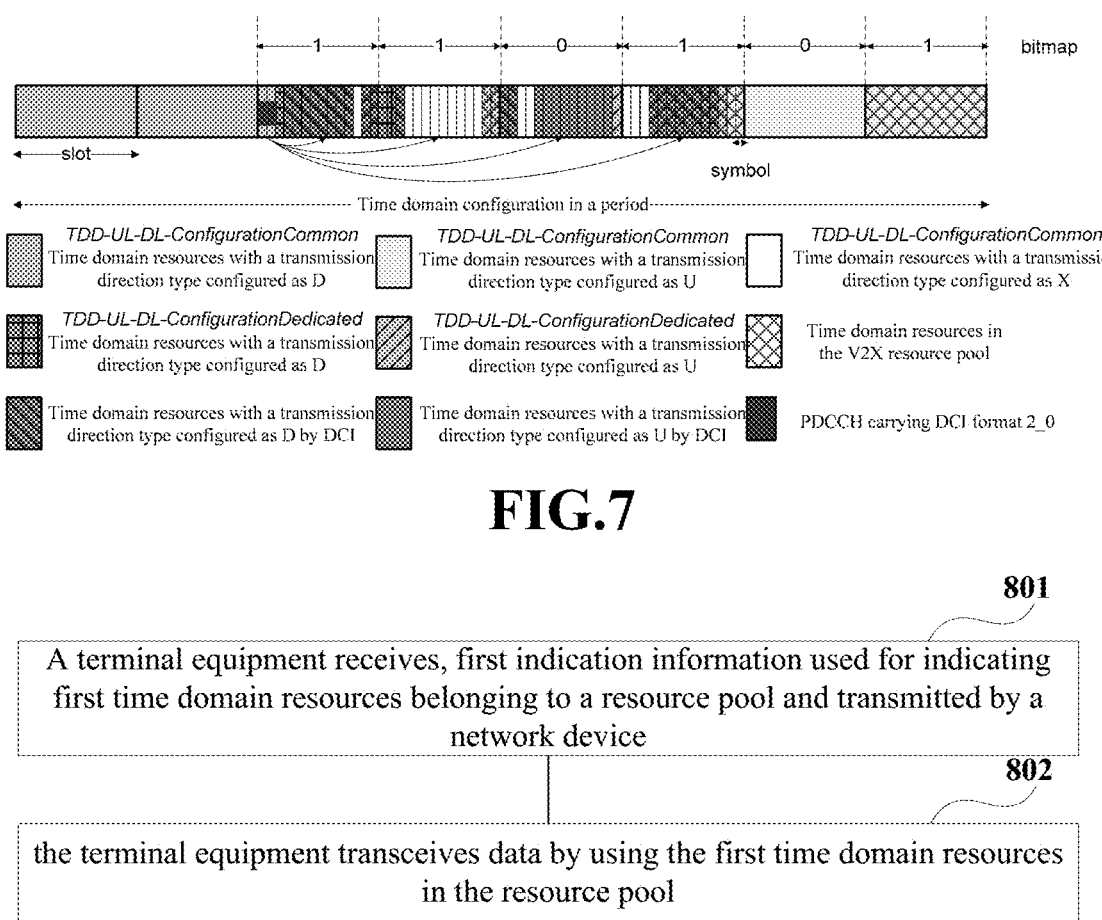

A terminal equipment receives, first indication information used for indicating first time domain resources belonging to a resource pool and transmitted by a network device

802 the terminal equipment transceives data by using the first time domain resources in the resource pool

A first terminal equipment receives, semi-persistent configuration information transmitted by a network device, or generates semi-persistent configuration information; wherein the semi-persistent configuration information is used to configure transmission direction types of the time domain resources

902

The first terminal equipment transmits broadcast information to a second terminal equipment, the broadcast information including the semi-persistent configuration information

FIG.9

1001 a network device Transmits first indication information used for indicating first time domain resources in a resource pool to a terminal equipment

1002 the network device Transmits second indication information used for dynamically indicating second time domain resources in the resource pool to the terminal equipment

FIG.10

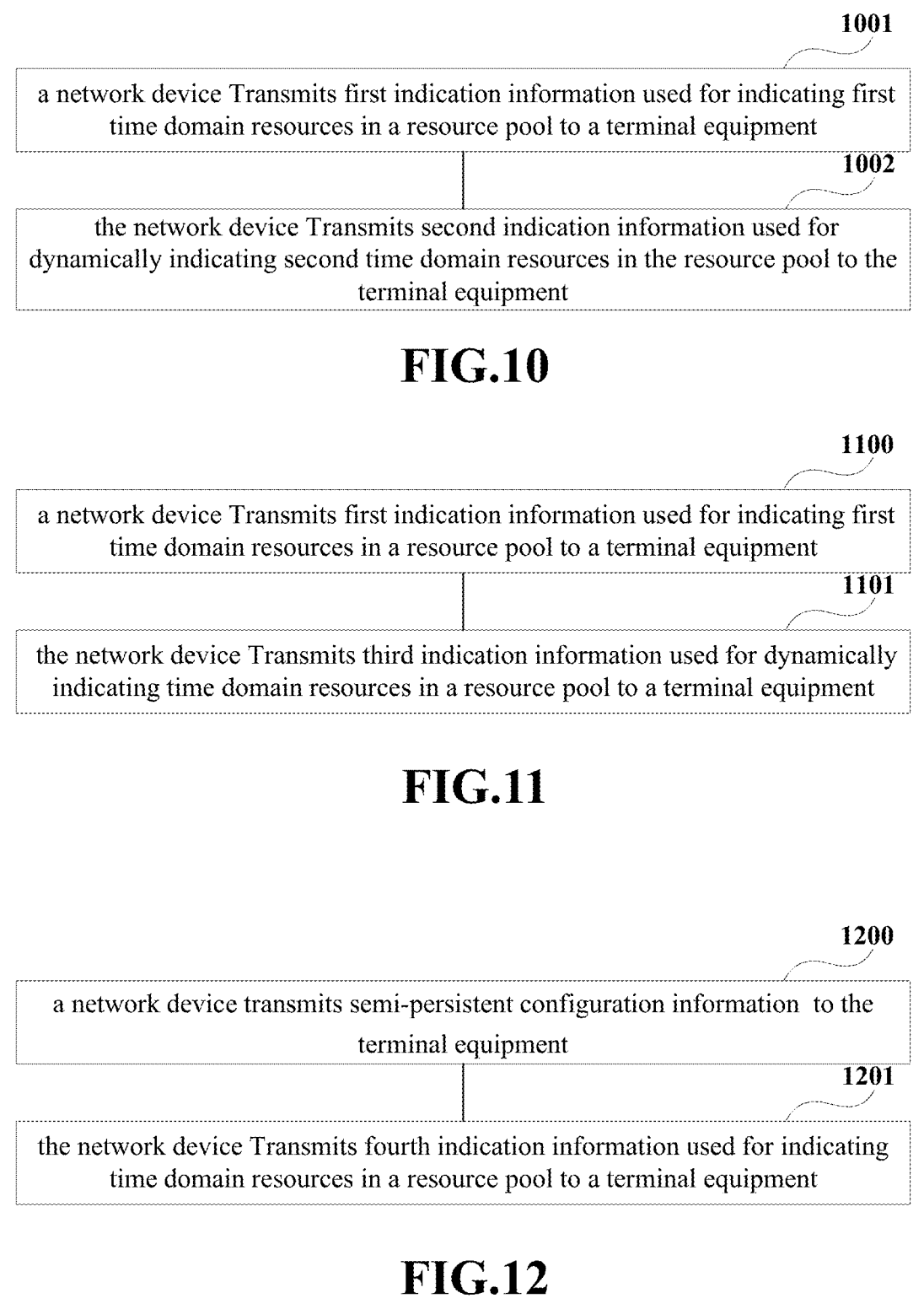

1100 a network device Transmits first indication information used for indicating first time domain resources in a resource pool to a terminal equipment

1101 the network device Transmits third indication information used for dynamically indicating time domain resources in a resource pool to a terminal equipment

FIG.11

1200 a network device transmits semi-persistent configuration information to the terminal equipment

1201 the network device Transmits fourth indication information used for indicating time domain resources in a resource pool to a terminal equipment

Figures 13, 14:
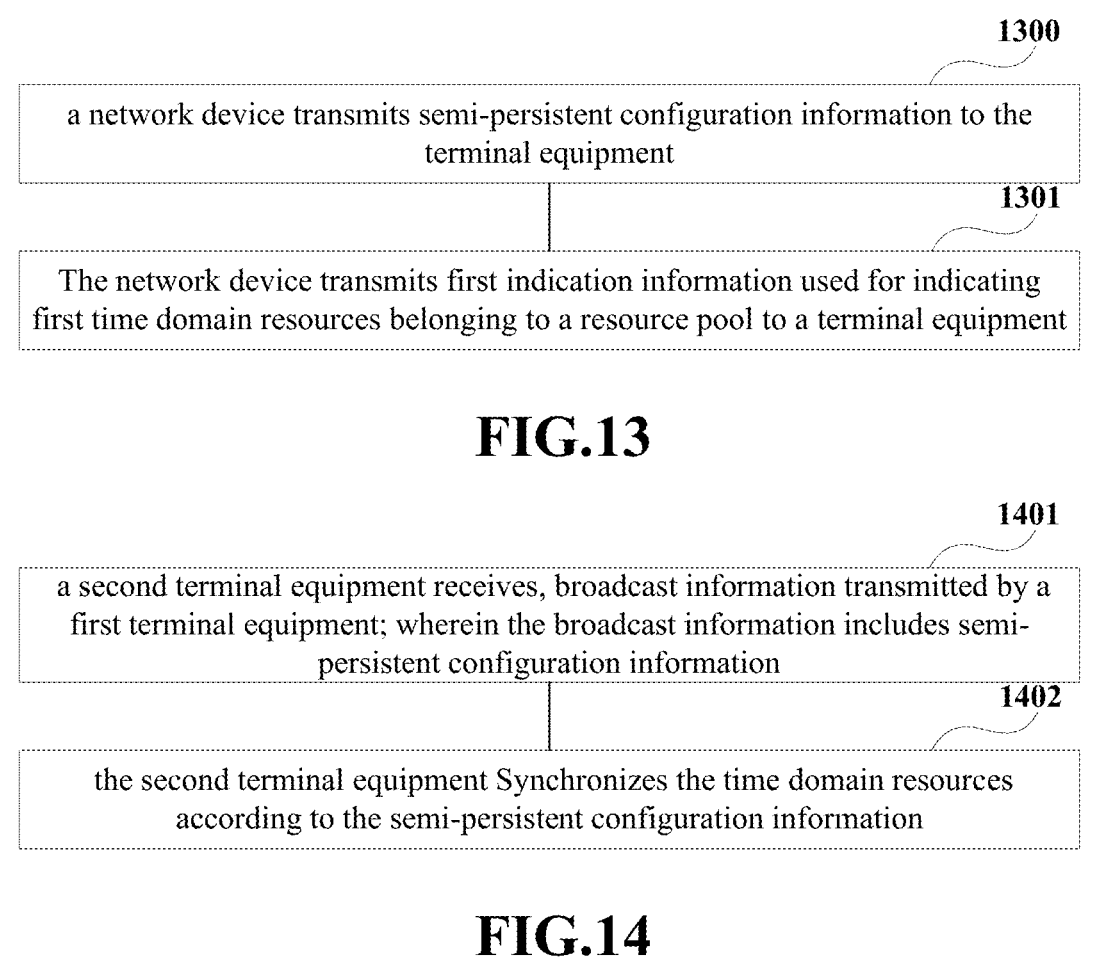

| a network device transmits semi-persistent configuration information to the terminal equipment |
|---|

1301

| The network device transmits first indication information used for indicating first time domain resources belonging to a resource pool to a terminal equipment |
|---|

| a second terminal equipment receives, broadcast information transmitted by a first terminal equipment; wherein the broadcast information includes semi-persistent configuration information |
|---|

1402

| the second terminal equipment Synchronizes the time domain resources according to the semi-persistent configuration information |
|---|

RESOURCE INDICATION METHOD AND APPARATUS AND COMMUNICATION SYSTEM

CROSS-REFERENCE TO RELATED APPLICATION

This application is a continuation of U.S. application Ser. No. 17/237,122, filed on Apr. 22, 2021, which is a continuation of International Application No. PCT/CN2018/113481 filed on Nov. 1, 2018, the entire contents of each are incorporated herein by reference.

TECHNICAL FIELD

This disclosure relates to the field of communication technologies, and in particular to a resource indication method and apparatus and a communication system.

BACKGROUND

V2X (vehicle to X) is information exchange between vehicles and the outside, which is a key technology of the future intelligent transportation system. V2X applications will improve driving safety, reduce congestion and vehicle energy consumption, improve traffic efficiency and in-vehicle entertainment information, etc. It performs wireless communication and information exchange and processing between vehicle-X (V2X: vehicles, roads, pedestrians, and the Internet, etc.) based on vehicle-to-vehicle (V2V), vehicle-to-pedestrian (V2P), vehicle-to-infrastructure (V2I), and vehicle-to-Network (V2N) communication.

V2X services may be provided in two ways: PC5 interface and Uu interface. The PC5 interface is an interface defined on the basis of a sidelink. Using this interface, communication and transmission may be directly performed terminal equipments.

In a long-term evolution (LTE) system, a V2X terminal equipment may either use resources scheduled in a resource pool, or use resources autonomously selected in the resource pool for data transmission and reception. For each resource pool, a corresponding bitmap is used to cyclically indicate which subframes in a system frame are included in the resource pool. In frequency division duplex FDD configuration, the bitmap is used to indicate whether a corresponding physical subframe is included in the resource pool; and as V2X may only use uplink subframes in time division duplex TDD configuration, what is indicated by the bitmap at this moment is a set composed of uplink subframes, i.e. whether a subframe of a logical subframe sequence number in the corresponding set is included in the resource pool.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY OF THE DISCLOSURE

In a future communication system, such as a New Radio (NR) system, flexible TDD configuration may be supported, that is, transmission direction types may be flexibly configured for time domain resources. The transmission direction types include uplink, downlink, and flexible; and wherein three levels of types of resources in a period may be configured.

A first level, semi-persistent configuration, which is configured by a higher layer parameter of a cell level, in which transmission direction types of symbols in a period are configured; a second level, semi-persistent configuration, which is configured by a higher layer parameter of a UE-specific level, in which transmission direction types of symbols in resources of transmission direction type "X" configured at the last level are further configured; a third level, dynamic configuration, which is configured by downlink control information, in which transmission direction types of symbols in resources of transmission direction type "X" configured at the last levels are further configured.

In the existing V2X communication, when a V2X terminal equipment operates on a carrier of a Uu interface, in order to avoid generation of interference, the V2X terminal equipment can only use uplink frequency points of the Uu interface, as the above three-level flexible TDD configuration is introduced into NR, there is currently no solution for how to indicate resources in a resource pool and how the terminal equipment determines resources in a resource pool when the NR V2X is deployed on a carrier of a Uu licensed frequency band.

In order to solve the above problems, embodiments of this disclosure provide a resource indication method and apparatus and communication system.

According to a first aspect of the embodiments of this disclosure, there is provided a resource indication method, wherein the method includes:

receiving, by a terminal equipment, first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol;

receiving, by the terminal equipment, second indication information used for dynamically indicating second time domain resources belonging to the resource pool and transmitted by the network device; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit; and transceiving data by the terminal equipment by using the first time domain resources and/or the second time domain resources in the resource pool.

According to a second aspect of the embodiments of this disclosure, there is provided a resource indication method, wherein the method includes:

receiving, by a terminal equipment, third indication information used for dynamically indicating time domain resources in a resource pool and transmitted by a network device; and transceiving data by the terminal equipment by using the time domain resources in the resource pool.

According to a third aspect of the embodiments of this disclosure, there is provided a resource indication method, wherein the method includes:

receiving, by a first terminal equipment, semi-persistent configuration information transmitted by a network device, or generating semi-persistent configuration information; wherein the semi-persistent configuration information is used to configure transmission direction types of the time domain resources, the transmission direction types including uplink, downlink, and flexible; and transmitting, by the first terminal equipment, broadcast information to a second terminal equipment, the broadcast information including the semi-persistent configuration information.

According to a fourth aspect of the embodiments of this disclosure, there is provided a resource indication apparatus, wherein the apparatus includes:

a first receiving unit configured to receive first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol;

a second receiving unit configured to receive second indication information used for dynamically indicating second time domain resources belonging to the resource pool and transmitted by the network device; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit; and a first processing unit configured to transceive data by using the first time domain resources and/or the second time domain resources in the resource pool.

According to a fifth aspect of the embodiments of this disclosure, there is provided a resource indication apparatus, wherein the apparatus includes:

a third receiving unit configured to receive third indication information used for dynamically indicating time domain resources in a resource pool and transmitted by a network device; and a second processing unit configured to transceive data by using the time domain resources in the resource pool.

According to a sixth aspect of the embodiments of this disclosure, there is provided a resource indication apparatus, wherein the apparatus includes:

a fourth receiving unit configured to receive semi-persistent configuration information transmitted by a network device, or generate semi-persistent configuration information; wherein the semi-persistent configuration information is used to configure transmission direction types of the time domain resources, the transmission direction types including uplink, downlink, and flexible; and a first transmitting unit configured to transmit broadcast information to a second terminal equipment, the broadcast information including the semi-persistent configuration information.

According to a seventh aspect of the embodiments of this disclosure, there is provided a communication system, including a network device and the terminal equipment, the terminal equipment including the resource indication apparatus as described in the first or the second or the third aspect.

An advantage of the embodiments of this disclosure exists in that by indicating by the indication information which time-domain resources in the semi-persistently configured and/or dynamically configured time-domain resources may be contained in the resource pool, the V2X terminal equipment may perform data transceiving by using the resources in the resource pool, thereby supporting V2X communication in a future communication system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings:

FIG. 1 is a schematic diagram of a communication system of an embodiment;

FIG. 2 is a flowchart of the resource indication method of Embodiment 1;

FIG. 3 is a schematic diagram of indicated resources of Embodiment 1;

FIG. 4 is a schematic diagram of resource indication of Embodiment 1;

FIG. 5 is a flowchart of the resource indication method of Embodiment 2;

FIG. 6 is a flowchart of the resource indication method of Embodiment 3;

FIG. 7 is a schematic diagram of indicated resources of Embodiment 3;

FIG. 8 is a flowchart of the resource indication method of Embodiment 4;

FIG. 9 is a flowchart of the resource indication method of Embodiment 5;

FIG. 10 is a flowchart of the resource indication method of Embodiment 6;

FIG. 11 is a flowchart of the resource indication method of Embodiment 7;

Figure 15:
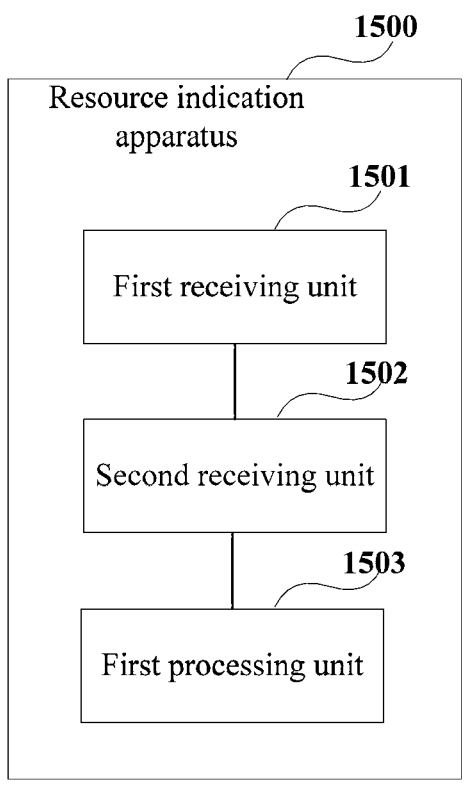
Figure 16:
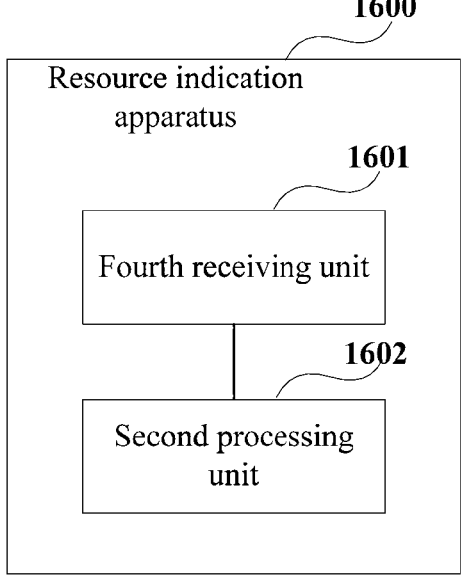
Figure 17:
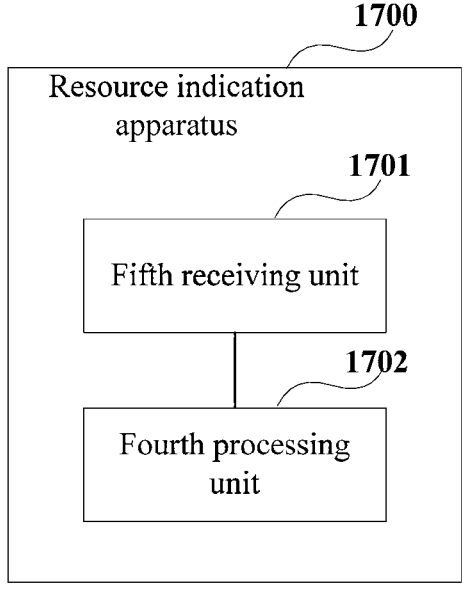
Figure 18:
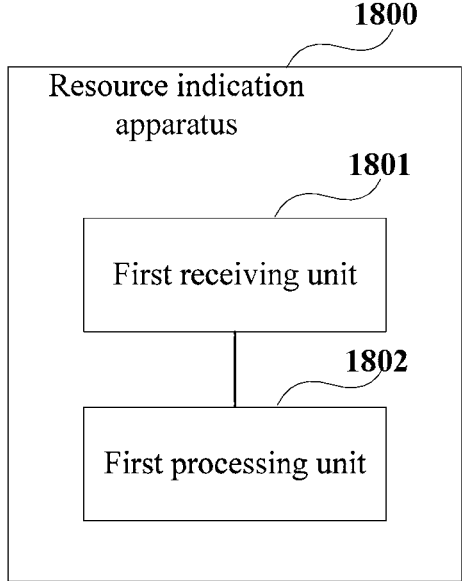
Figure 19:
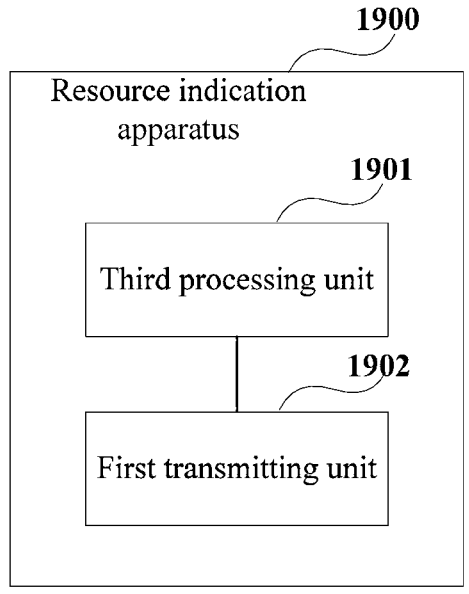
Figure 20:
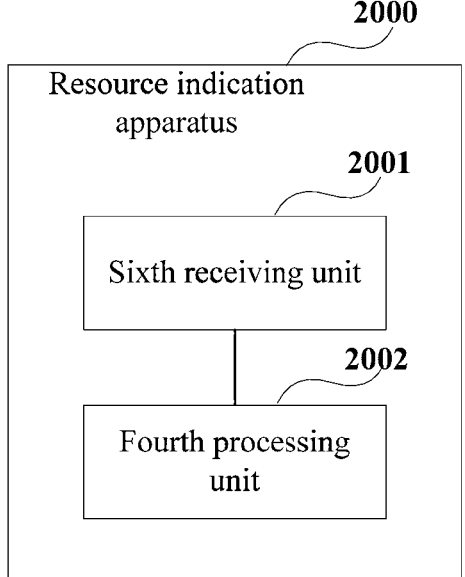
Figure 21:
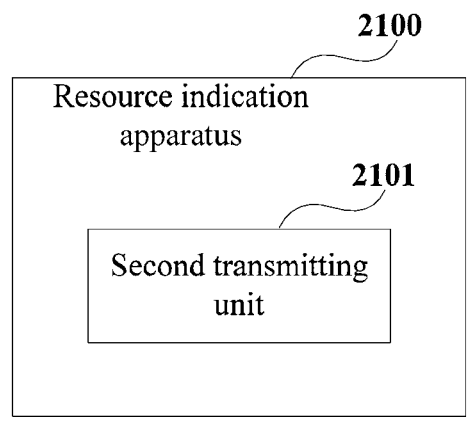
Figure 22:
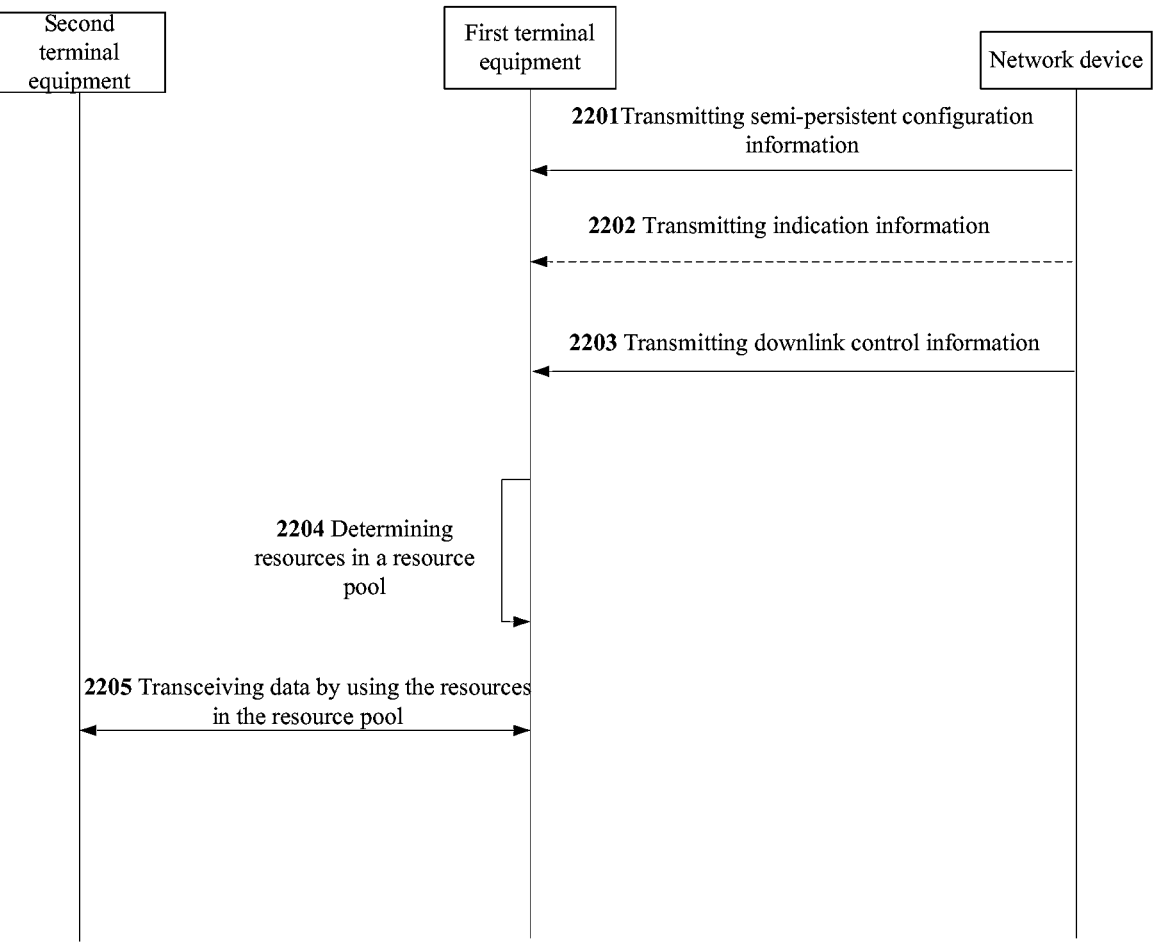
Figure 23:
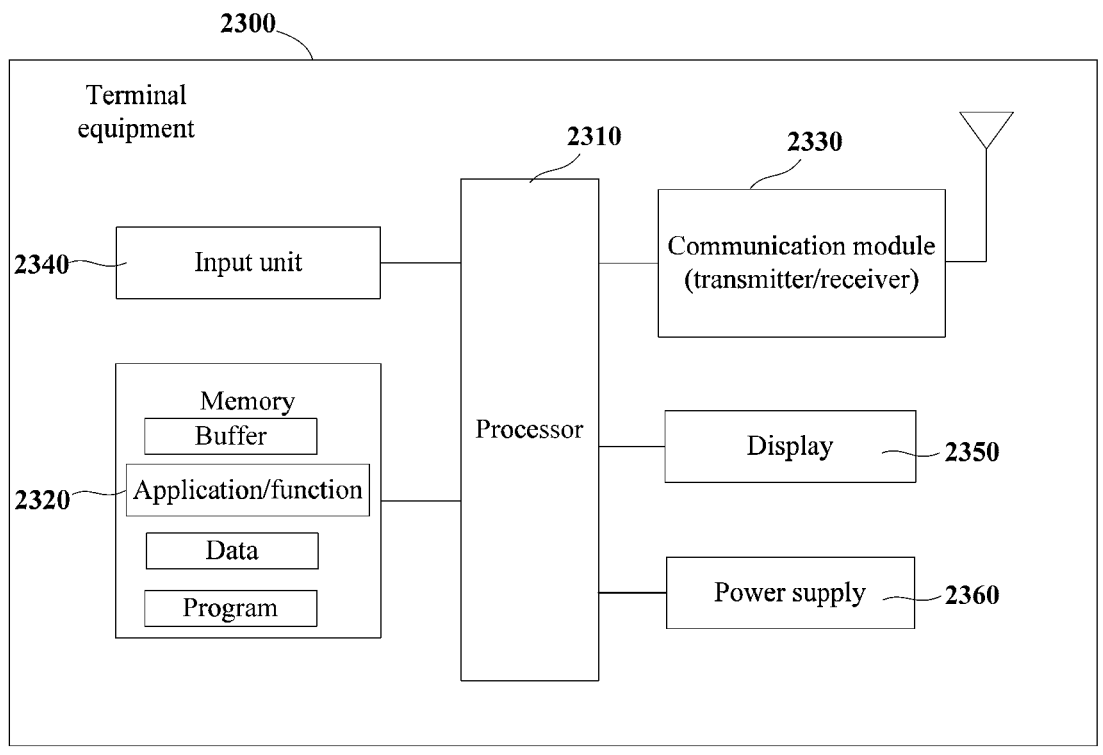
Figure 24:
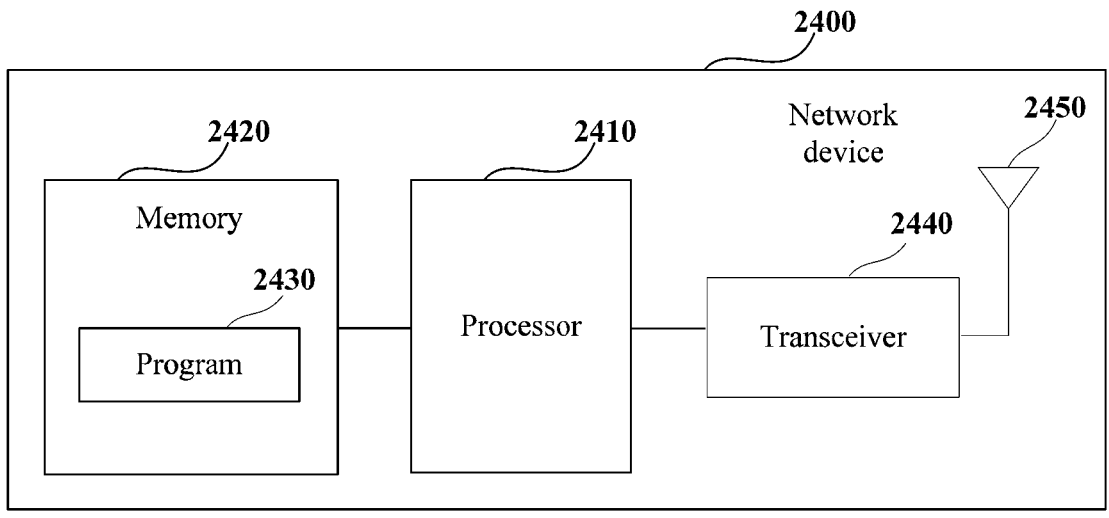

FIG. 12 is a flowchart of the resource indication method of Embodiment 8;

FIG. 13 is a flowchart of the resource indication method of Embodiment 9;

FIG. 14 is a flowchart of the resource indication method of Embodiment 10;

FIG. 15 is a schematic diagram of a structure of the resource indication apparatus of Embodiment 11;

FIG. 16 is a schematic diagram of a structure of the resource indication apparatus of Embodiment 12;

FIG. 17 is a schematic diagram of a structure of the resource indication apparatus of Embodiment 13;

FIG. 18 is a schematic diagram of a structure of the resource indication apparatus of Embodiment 14;

FIG. 19 is a schematic diagram of a structure of the resource indication apparatus of Embodiment 15;

FIG. 20 is a schematic diagram of a structure of the resource indication apparatus of Embodiment 16;

FIG. 21 is a schematic diagram of a structure of the resource indication apparatus of Embodiment 17;

FIG. 22 is a flowchart of the resource indication method of Embodiment 18;

FIG. 23 is a schematic diagram of a structure of the terminal equipment of Embodiment 18; and FIG. 24 is a schematic diagram of a structure of the network device of Embodiment 18.

DETAILED DESCRIPTION OF THE DISCLOSURE

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, an equipment accessing to a communication network and receiving network services via a network device, and may also be referred to as. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, description is given in FIG. 1 by taking one terminal equipment as an example; however, the embodiment of this disclosure is not limited thereto.

It should be noted that the embodiments of this disclosure are described by taking V2X in an NR system; however, the embodiments of this disclosure are not limited thereto.

The embodiments of this disclosure shall be described below with reference to the accompanying drawings.

Embodiment 1

FIG. 2 is a flowchart of the resource indication method of Embodiment 1, which is applicable to a terminal equipment side. As shown in FIG. 2, the method includes:

step 201: a terminal equipment receives, first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol;

step 202: the terminal equipment receives, second indication information used for dynamically indicating second time domain resources belonging to the resource pool and transmitted by the network device; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit; and step 203: the terminal equipment transceives data by using the first time domain resources and/or the second time domain resources in the resource pool.

In this embodiment, the first indication information in step 201 indicates which resources in the semi-persistently configured time domain resources are included in the resource pool, the second indication information in step 202 is used to further dynamically indicate which resources in time domain resources not contained in the resource pool indicated by the first indication information and in time domain resources of a transmission direction type being flexible remained after configuration is performed by the semi-persistent configuration information are included in the resource pool, and the terminal equipment may determine the time-domain resources in the resource pool according to the first indication information and the second indication information, the time-domain resources in the resource pool being able to be used by V2X sidelink communication. Hence, after obtaining the resource pool, the terminal equipment may use resources scheduled in the resource pool, or autonomously select resources from the resource pool for V2X sidelink communication (i.e. mode 2), that is, communication between V2X terminal equipments.

The first indication information and the second indication information shall be described below respectively.

In step 201, the first indication information is used to indicate which of the first time domain units with transmission direction types being configured by the semi-persistent configuration information (this part of the first time domain units are hereinafter referred to as second time domain units) with a transmission direction type of uplink symbol constituting the first time domain units in the resource pool.

In this embodiment, the method further includes (not shown): the terminal equipment receives, the semi-persistent configuration information transmitted by the network device, the semi-persistent configuration information including cell-level configuration information and/or UE-specific-level configuration information and being used for configuring transmission direction types of the time domain resources; wherein the transmission direction types include uplink U, downlink D, and flexible X/F.

In this embodiment, the cell-level configuration information belongs to first-level configuration of a flexible slot structure, and it is carried by a higher-layer parameter TDD-UL-DL-ConfigurationCommon, and is contained in broadcasted system information for configuring transmission direction types of symbols in a period, such as being configured as a slot with a few former symbols contained in a period that are completely "D", and a few consecutive "D" symbols immediately after the last "D" slot, and/or being configured as a slot with a few latter symbols contained in a period that are completely "U", a few consecutive "U" symbols immediately before the first "U" slot, and other symbols as being "X".

In this embodiment, the UE-specific-level configuration information belongs to the second-level configuration, and it is carried by a higher-layer parameter TDD-UL-DL-Configurationdedicated, and is included in radio resource control dedicated signaling. For the remaining "X" resources after the last-level configuration, it configures that a few former symbols in the slot containing these "X" resources to be "D" and/or a few latter symbols to be "U", and the remaining symbol are still "X".

In this embodiment, the semi-persistent configuration information may include one or both of the cell-level configuration information and UE-specific-level configuration information, and this embodiment is not limited thereto. The semi-persistent configuration information configures transmission types of symbols in a period, and cyclically configures transmission types of symbols in a later-described period of the time-domain resources in the same manner as the period. The first indication information only indicates the time domain units included as U configured by the semi-persistent configuration information (i.e. the at least one first time domain unit), in other words, for time domain units containing no U configured by the semi-persistent configuration information, and an index of a logical time domain unit indicated by the first indication information performs hopping on it.

Therefore, in this embodiment, the first indication information indicates by taking a time domain unit as a granularity, the time domain unit including a first predetermined number (N1) of symbols, wherein at least one symbol is configured as an uplink symbol by the semi-persistent configuration information. Optionally, the second predetermined number of symbols may all be uplink symbols; however, this embodiment is not limited thereto.

For example, the time domain unit includes 14 (N1) symbols, that is, the time domain unit is of a slot, or the time domain unit may include less than 14 (N1) symbols, that is, the time domain unit is of a mini-slot, and this embodiment is not limited thereto, the first time domain unit and the second time domain unit have the same structure. The at least one second time domain unit is a part of first time domain units in the at least one first time domain unit, and the part of first time domain unit is indicated by the first indication information as containing uplink symbols constituting the first time domain resource.

In one implementation, the first indication information is a bitmap, and may periodically cyclically indicate first time domain units in which uplink symbols constitute the first time domain resource, each bit of the bitmap correspondingly indicating a first time domain unit in a period. When a value of the bit is a first value (such as 1), it indicates that the first time domain unit is the second time domain unit, that is, the first time domain unit indicated by the bitmap as being of the first value is also called a second time domain unit, symbols with a transmission direction type being uplink in the second time domain unit belonging to the resource pool, wherein, when transmission direction type of all the symbols in the second time domain unit is uplink, each symbol in the second time domain unit is belonging to the resource pool, and when a value of the bit is a second value (such as 0), it indicates that the first time domain unit is a remained time domain unit, that is, the first time domain unit indicated by the bitmap as being of the second value is also called a remained time domain unit, all symbols in the remained time domain unit not belonging to the resource pool. A length of the bitmap may be determined as demanded, the at least one first time domain unit configured by the semi-persistent configuration information may be cyclically indicated according to the bitmap; for example, the length of the bitmap is 6, and logical indices of the at least one first time domain unit are 0, 1, . . . , I, . . . , respectively; wherein the bitmap may cyclically indicate 0th to 5th first time domain units, and 6th to 11th time domain unit, and so on. For example, when the bitmap is 110101, a first time domain unit with indices mod 6=0, 1, 3, 5 is also called a second time domain unit, symbols with a transmission direction type being uplink in the second time domain unit belonging to the resource pool. It should be noted that as the first time domain unit is a time domain unit containing U, and hopping is performed on time domain units containing D or D+X only, the indices of the first time domain unit here are not necessarily consistent with its physical indices, but are indices reordered logically.

Figure 3:
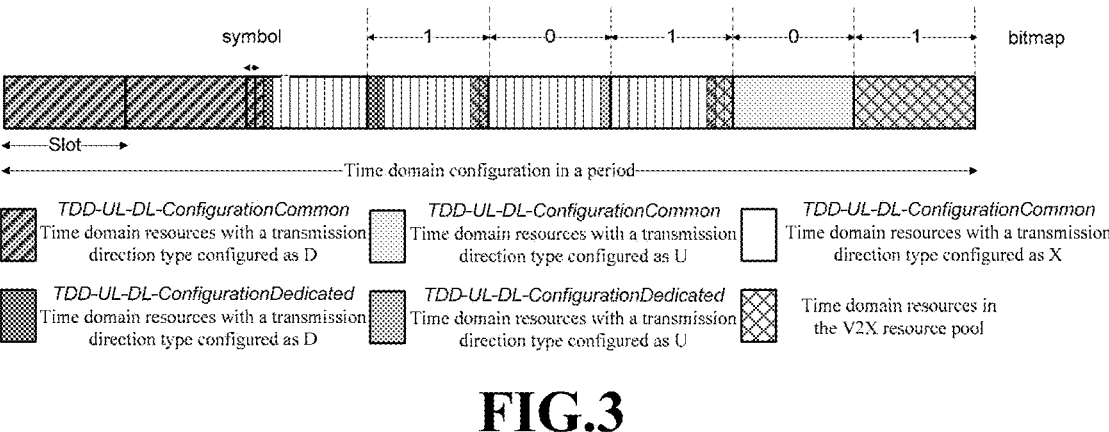

FIG. 3 is a schematic diagram of indicated resources in this implementation, which shall be described by taking that the first time domain unit as of a slot as an example. As shown in FIG. 3, for former three slots in the period, as only D or X symbols are contained and U symbol are not contained, the bitmap does not act on the former three slots; and for the latter five slots, the first indication information indicates that the bitmap is 10101, which means that symbols with a transmission direction type being U in a logical first, third and fifth slots (a physical fourth, sixth and eighth slots) in slots containing U belong to the resource pool.

In one implementation, the first indication information may indicate the first time domain resource in a manner of starting position+length, that is, the first indication information indicates a starting position and a length of the at least one second time domain unit in a period, the starting position being denoted by a logical index of the second time domain unit, and the length being denoted by the number of second time domain units. The first time domain units of these numbers may be physically continuous or discontinuous, but the indices are continuous logically, and the first indication information also periodically cyclically indicates first time domain units in which uplink symbols constitute the first time domain resource.

In this embodiment, identical or different first indication information may be used to indicate the second time domain units configured by the cell-level configuration information and the UE-specific-level configuration information, respectively; for example, information of the same bitmap or starting position+length may be used to indicate the second time domain units configured by the cell-level configuration information and the UE-specific-level configuration information, or information of two bitmaps or starting position+length may be used to respectively indicate the second time domain units configured by the cell-level configuration information and the UE-specific-level configuration information; wherein different first indication information is used, numbers of symbols included in each time domain unit configured by the cell-level configuration information and the UE-specific-level configuration information is identical or different; for example, for the cell-level configuration information, the time domain unit may be a slot, and for the UE-specific-level configuration information, the time domain unit may be a mini-slot, and this embodiment is not limited thereto.

In this embodiment, the first indication information in step 201 may be carried by a new information element, or may be carried by an original information element. The first indication information and the semi-persistent configuration information may be transmitted together, or may be transmitted separately, and this embodiment is not limited thereto.

In step 202, the second indication information dynamically indicates the second time domain resource belonging to the resource pool, and the second indication information is used to indicate a time domain resource in a third time domain resource belonging to the resource pool; wherein the third time domain resource includes a time domain resource with a transmission direction type being flexible remained after being configured by the semi-persistent configuration information and/or at least one remained time domain unit in the at least one first time domain unit other than the at least one second time domain unit, that is, the second indication information is used to indicate which time domain resources in the remaining time domain resources with a transmission direction type being flexible belong to the resource pool and/or which time domain units in at least one remained time domain unit in the at least one first time domain unit other than the at least one second time domain unit belong to the resource pool; wherein the time domain resources belonging to the resource pool constitute the second time domain resources in the resource pool.

In this embodiment, the second indication information is used to indicate a transmission direction type of the third time domain resource, wherein the transmission direction type includes uplink U, downlink D, flexible X, and side link S, and the third time domain resource with the transmission direction type being sidelink belongs to the resource pool.

That is, for time domain resources with a transmission direction type being flexible X remained after being configured by the semi-persistent configuration information, the second indication information may explicitly indicate resources in this part of resources of which a transmission direction type is changed from X to S, and for a third time domain unit other than the second time domain unit in the first time domain unit, the second indication information may indicate all or part of time domain resources with a transmission direction type being U and/or X in the remained time domain unit are changed into S.

In one implementation, the second indication information is included in first downlink control information (DCI). A format of the DCI may be an existing format 2_0, and the downlink control information may be included in a group common physical downlink control channel; or it may be in other formats and included in other downlink control channels, and this embodiment is not limited thereto. In existing third-level configuration, transmission direction types of symbols in resources with a transmission direction type being X remained after being performed former two levels of configuration may be dynamically configured by the DCI, with a difference from the related art being that in this embodiment, the transmission direction types dynamically configured by the DCI further include a sidelink (S) type in addition to the uplink, downlink and flexible.

In this implementation, the second indication information indirectly indicates the time domain resources in the resource pool in a two-step indication manner. For example, the second indication information is first index information, the first index information being used to indicate one or at least two pieces of second index information, and according to a predetermined correspondence between the first index information and the second index information, the terminal equipment side may determine the one or at least two pieces of second index information indicated by the second indication information (numbers of pieces of the second index information indicated by each piece of first index information are identical or different); wherein each second index information is used to indicate a format of a time domain unit, and the format of the time domain unit includes a transmission direction type of each symbol in the time domain unit. The time domain unit includes a predetermined number of symbols, and the number of symbols contained in the time domain unit is not limited in this embodiment. Following description shall be given by taking that the time domain unit is a slot as an example.

In this implementation, after determining the second index information, the terminal equipment may determine a format of a time domain unit to which each second index information corresponds according to a predetermined second correspondence, determine time domain resources with a transmission direction type being sidelink in the third time domain resources according to format(s) of the indicated one or at least two time domain units, and determine the resources with the transmission direction type being sidelink as the time domain resource of the resource pool.

Table 1 below is an existing table of correspondence between the second index information (such as 8 bits) and a format of a time domain unit (slot).

| Second index | Symbols in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | ... | | | | | | | | | | | | | |

As shown in Table 1, different second index information corresponds to different slot formats, and each slot format includes a transmission direction type of each symbol in the slot. In the second correspondence of this embodiment, what is different from Table 1 above is that in one implementation, a slot format to which second index information of 0-55 corresponds may use a slot format in Table 1, and slot format to which reserved second index information of 56-254 corresponds may be newly added. This slot format includes symbols with a transmission direction type S, for example, a slot format with a second index of 56 is DDDDDDDDDSSSSS. In this implementation, the V2X terminal equipment and other types of terminal equipments have the same understanding of the correspondence; and in another implementation, in slot format to which second index information of 0-55 and 255 corresponds, symbols with a transmission direction type being S may be included (for example, existing U/X is directly modified into S; however, this embodiment is not limited thereto); and second index information of 56-254 may be reserved, and slot formats to which the second index information of 56-254 corresponds may be newly added; however, this embodiment is not limited thereto. In this implementation, the V2X terminal equipment and other types of terminal equipments have different understanding of the second correspondence, that is, for the V2X terminal equipment, a second correspondence polled by it after receiving the second indication information is different from that of other terminal equipments.

In this implementation, transmission direction types of symbols with transmission direction types configured as being U and/or X in an existing slot format may be modified into S for use in sidelink communication; however, this embodiment is not limited thereto.

Figure 4:
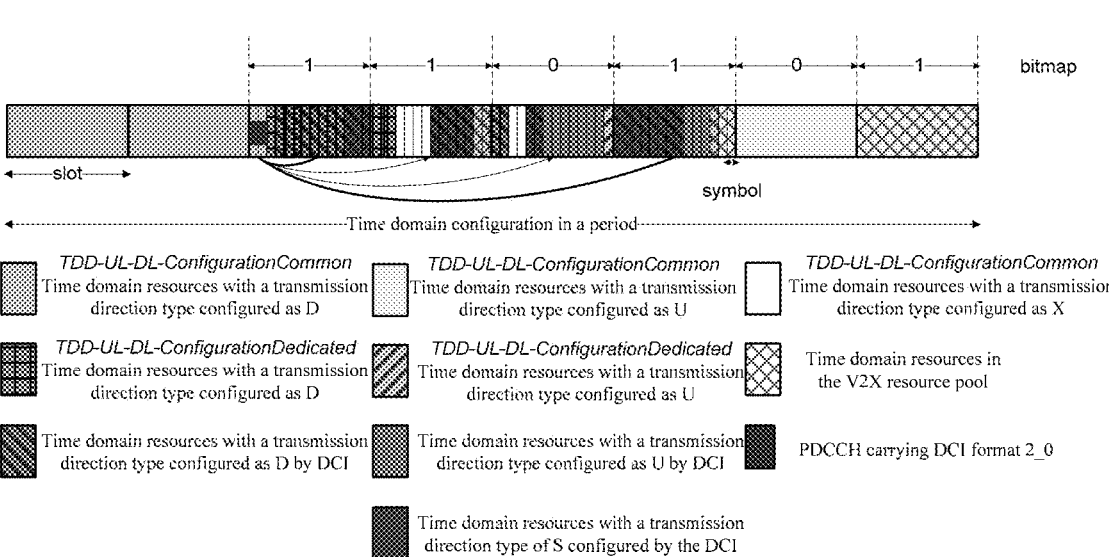

FIG. 4 is a schematic diagram of resources indicated by the second indication information in this implementation. As shown in FIG. 4, for remaining symbols with a transmission direction type being X configured by the semi-persistent configuration information and first time domain units indicated as 0 by the first indication information bitmap in step 201 (also referred to as remained time domain units), the DCI is used to dynamically indicate that a transmission direction type of part symbols of time domain resources in the above resources is S, the symbols with the transmission direction type S belonging to the second time domain resources in the resource pool.

In one implementation, the second indication information may also be included in second downlink control information. The second downlink control information may be of a newly-designed DCI format; however, this embodiment is not limited thereto. The second indication information is the first index information, and in this implementation, the second indication information indirectly indicates the time domain resources in the resource pool in a two-step indication manner. For example, the second indication information is the first index information, the index information is used to indicate one or at least two pieces of second index information, and the terminal equipment side may determine one or at least two pieces of second index information indicated by the second indication information according to the predetermined first correspondence between the first index information and the second index information (numbers of pieces of the second index information indicated by each first index information are identical or different); wherein each piece of second index information is used to indicate a bitmap, and in the bitmap, a time domain unit to which a bit value of a first value corresponds belongs to the resource pool, and a time domain unit to which a bit value of a second value corresponds does not belong to the resource pool.

In this implementation, after determining the second index information, the terminal equipment may determine a bitmap to which each second index information corresponds according to a preset third correspondence (a correspondence between the second index information and bitmaps), and determine symbols in the third time domain resource indicated by the bitmap as being of the first value according to the indicated one or at least two bitmaps, wherein symbols with a bit value of the first value belong to the resource pool.

In one implementation, the second indication information may also be included in second downlink control information. The second downlink control information may be of a newly-designed DCI format; however, this embodiment is not limited thereto. The second indication information is the first index information, and in this implementation, the second indication information directly indicates the time domain resources in the resource pool in a one-step indication manner. For example, the second indication information is the first index information, the first index information is used to indicate one or at least two bitmaps, and the terminal equipment side may determine one or at least two bitmaps indicated by the second indication information according to a predetermined fourth correspondence between the first index information and bitmaps; and in the bitmap, a time domain unit to which a bit value of a first value corresponds belongs to the resource pool, and a time domain unit to which a bit value of a second value corresponds does not belong to the resource pool.

In this embodiment, the number of pieces of the second index information indicated by the first index information is equivalent to the number of time domain units in the third time domain resource that may be indicated by it. In step 202, the terminal equipment may periodically detect the second indication information in a physical downlink control channel, and determine whether symbols in the third time domain resource belong to the resource pool according to formats/bitmaps of time domain units indicated by the second indication information detected in each period. Different from cyclically indicating by the first indication information, the second indication information periodically detects, second indication information detected in a detection period indicates at least one time domain unit (the number of the time domain units and the number of pieces of the second index information are identical), and second indication information detected in a next detection period indicates at least one subsequent time domain unit (the number of the time domain units and the number of pieces of the second index information are different), and so on, instead of cyclically indicating time domain resources in each period in the third time domain resources by second indication information detected in one period.

In this embodiment, before step 203, the terminal equipment may determine the time domain resources in the resource pool according to the first indication information and the second indication information. In step 203, the terminal equipment uses the resources scheduled in the first time domain resources and/or the second time domain resources in the resource pool, or may autonomously select resources from the first time domain resources and/or second time domain resources of the resource pool, for V2X sidelink communication, that is, on the resources, it transmits data to other terminal equipments, or receives data transmitted by other terminal equipments.

With the above embodiment, by indicating by the first indication information which time domain resources configured by the semi-persistent configuration information belong to the resource pool and dynamically indicating the time domain resources in the resource pool by the second indication information, the V2X terminal equipment may use the resources in the resource pool to perform data transmission and reception, thereby supporting V2X communication in a future communication system.

Embodiment 2

FIG. 5 is a flowchart of the resource indication method of Embodiment 2, which is applicable to a terminal equipment side. As shown in FIG. 5, the method includes:

step 501: a terminal equipment receives, third indication information used for dynamically indicating time domain resources in a resource pool and transmitted by a network device; and step 502: the terminal equipment transceives data by using the time domain resources in the resource pool.

In this embodiment, the method further includes (not shown): the terminal equipment receives, semi-persistent configuration information transmitted by the network device, the semi-persistent configuration information including cell-level configuration information and/or UE-specific-level configuration information and being used to configure transmission direction types of the time domain resources, the transmission direction types including uplink U, downlink D, and flexible X/F. reference may be made to Embodiment 1 for particular implementation of the semi-persistent configuration information, which shall not be described herein any further.

In this embodiment, the third indication information is used for indicating time domain resources in fourth time domain resources belonging to the resource pool; wherein the fourth time domain resources contain at least one third time domain unit with a transmission direction type being configured by the semi-persistent configuration information, the third time domain unit including a first predetermined number (N1) symbols. For example, the third time domain unit includes 14 symbols, that is, the third time domain unit is of a slot, or the third time domain unit may include less than 14 symbols, that is, the third time domain unit is of a mini-slot, and this embodiment is not limited thereto.

In one implementation, the third indication information is contained in first downlink control information. Reference may be made to the second indication information in Embodiment 1, that is, the third indication information is used to dynamically indicate a transmission direction type of the fourth time domain resources, wherein the transmission direction type includes uplink U, downlink D, flexible X and sidelink S, and a fourth time domain resource with a transmission direction type sidelink S belongs to the resource pool. That is, for the fourth time domain resource, the third indication information may indicate that transmission direction types of all or part of time domain resources with transmission direction types being U and/or X and/or D in the fourth time domain resource are changed into S, for example, the third indication information indicates that symbols with a transmission direction type being sidelink cover symbols with a transmission direction type being flexible in the fourth time domain resource; alternatively, they may also cover symbols with transmission direction types being uplink+flexible in the fourth time domain resource; alternatively, they may also cover symbols with transmission direction types being uplink+downlink+flexible in the fourth time domain resource.

For example, the third indication information is included in first downlink control information (DCI). A format of the DCI may be an existing format 2_0, and the downlink control information may be included in a group common physical downlink control channel; or it may be in other formats and included in other downlink control channels, and this embodiment is not limited thereto. In existing third-level configuration, transmission direction types of symbols in resources with a transmission direction type being X remained after being performed former two levels of configuration may be dynamically configured by the DCI, with a difference from the related art being that in this embodiment, the transmission direction types dynamically configured by the DCI further include a sidelink (S) type in addition to the uplink, downlink and flexible.

In this embodiment, the third indication information indirectly indicates the time domain resources in the resource pool in a two-step indication manner. For example, the third indication information is first index information, the first index information being used to indicate one or at least two pieces of second index information, and according to a predetermined correspondence between the first index information and the second index information, the terminal equipment side may determine the one or at least two pieces of second index information indicated by the third indication information (numbers of pieces of the second index information indicated by each piece of first index information are identical or different); wherein each second index information is used to indicate a format of a time domain unit, and the format of the time domain unit includes a transmission direction type of each symbol in the time domain unit. The time domain unit includes a predetermined number of symbols, and the number of symbols contained in the time domain unit is not limited in this embodiment. After determining the second index information, the terminal equipment may determine a format of a time domain unit to which each second index information corresponds according to a predetermined second correspondence, determine time domain resources with a transmission direction type being sidelink in the fourth time domain resources according to format(s) of the indicated one or at least two time domain units, and determine the resources with the transmission direction type being sidelink as the time domain resource of the resource pool. Reference may be made to Embodiment 1 for implementation of the second correspondence, which shall not be described herein any further.

In another implementation, the third indication information is included in second downlink control information, and by using a bitmap, the third indication information indicates which time domain resources in the fourth time domain resources belong to the resource pool.

For example, the third indication information is included in the second downlink control information, a format of the downlink control information may be of a newly-designed DCI format; however, this embodiment is not limited thereto. The third indication information indirectly indicates the time domain resources in the resource pool in a two-step indication manner. For example, the third indication information is the first index information, the first index information is used to indicate one or at least two pieces of second index information, and the terminal equipment side may determine one or at least two pieces of second index information indicated by the third indication information according to the predetermined first correspondence between the first index information and the second index information (numbers of pieces of the second index information indicated by each first index information are identical or different); wherein each piece of second index information is used to indicate a bitmap, and in the bitmap, a time domain unit to which a bit value of a first value (such as 1) corresponds belongs to the resource pool, and a time domain unit to which a bit value of a second value (such as 0) corresponds does not belong to the resource pool. Each bit of the bitmap corresponds to a slot or mini slot or symbol, and a length of the bitmap is not limited in this disclosure (for example, when each bit corresponds to a symbol, the length of the bitmap may be equal to or less than 14). After determining the second index information, the terminal equipment may determine may determine a bitmap to which each second index information corresponds according to a preset third correspondence (a correspondence between the second index information and bitmaps), and determine time domain resources in the fourth time domain resources belonging to the resource pool (i.e. time domain resources of which a corresponding bit value is the first value) according to the indicated one or at least two bitmaps.

For example, the third indication information is included in the second downlink control information. Implementation of the downlink control information is as described above, which shall not be described herein any further. The third indication information directly indicates the time domain resources in the resource pool in a one-step indication manner. For example, the third indication information is the first index information, the first index information is used to indicate one or at least two bitmaps, and the terminal equipment side may determine one or at least two bitmaps indicated by the third indication information according to a predetermined fourth correspondence between the first index information and bitmaps; and in the bitmap, a time domain unit to which a bit value of a first value (such as 1) corresponds belongs to the resource pool, and a time domain unit to which a bit value of a second value (such as 0) corresponds does not belong to the resource pool. Each bit of the bitmap corresponds to a slot or mini slot or symbol, and the terminal equipment determines time domain resources in the fourth time domain resources belonging to the resource pool (i.e. time domain resources of which a corresponding bit value is the first value) according to the indicated one or at least two bitmaps.

In this implementation, the third indication information indicates that symbols with a bit value of the first value cover symbols with transmission direction types being uplink, and/or flexible, and/or downlink, in the fourth time domain resources, such as covering symbols with a transmission direction type being flexible in the fourth time domain resources; alternatively, they may also cover symbols with transmission direction types being uplink+flexible in the fourth time domain resource; alternatively, they may also cover symbols with transmission direction types being uplink+downlink+flexible in the fourth time domain resource.

In this embodiment, the number of pieces of the second index information indicated by the first index information is equivalent to the number of time domain units in the fourth time domain resources that may be indicated by it. In step 501, the terminal equipment may periodically detect the third indication information in a physical downlink control channel, and determine whether symbols in the fourth time domain resources belong to the resource pool according to formats/bitmaps of time domain units indicated by the third indication information detected in each period. Different from cyclically indicating by the first indication information in Embodiment 1, the third indication information periodically detects, third indication information detected in a detection period indicates at least one time domain unit (the number of the time domain units and the number of pieces of the second index information are identical), and third indication information detected in a next detection period indicates at least one subsequent time domain unit (the number of the time domain units and the number of pieces of the second index information are identical), and so on, instead of cyclically indicating time domain resources in each period in the fourth time domain resources by third indication information detected in one period.

In this embodiment, reference may be made to step 203 in Embodiment 1 for implementation of step 502, which shall not be described herein any further.

With the above embodiment, the time domain resources in the resource pool are dynamically indicated by the third indication information, and the terminal equipment may perform data transmission and reception according to the time domain resources in the resource pool, thereby supporting V2X communication in a future communication system.

Embodiment 3

FIG. 6 is a flowchart of the resource indication method of Embodiment 3, which is applicable to a terminal equipment side. Different from embodiments 1 and 2, in this embodiment, after time domain resources in a resource pool are indicated by fourth indication information, the time domain resources in the resource pool need to be re-determined according to dynamic resource indication information, which shall be described below in detail.

As shown in FIG. 6, the method includes:

step 601: a terminal equipment receives, fourth indication information used for indicating time domain resources in a resource pool and transmitted by a network device; wherein the fourth indication information is used for indicating a fourth time domain unit in at least one fourth time domain unit belonging to the resource pool, each fourth time domain unit containing at least one flexible symbol and/or at least one uplink symbol;

step 602: the terminal equipment transceives data by using the time domain resources in the resource pool.

In this embodiment, the at least one fourth time domain unit is a time domain resource configured with a transmission direction type by semi-persistent configuration information, and reference may be made to Embodiment 1 for implementation of the semi-persistent configuration information. And the method may further include (not shown): the terminal equipment receives, the semi-persistent configuration information transmitted by the network device.

In step 601, the fourth indication information is used to indicate a fourth time domain unit belonging to the resource pool in the at least fourth time domain unit configured by the semi-persistent configuration information, that is, the fourth indication information is used to indicate which of the at least one fourth time domain unit configured by the semi-persistent configuration information belongs to the resource pool.

In this embodiment, the fourth indication information only indicates the time domain units included as U and/or X configured by the semi-persistent configuration information, in other words, for time domain units only containing D configured by the semi-persistent configuration information, and an index of a logical time domain unit indicated by the fourth indication information performs hopping on it.

Therefore, in this embodiment, the fourth indication information indicates by taking the fourth time domain unit as a granularity, the fourth time domain unit including N1 symbols, the N1 symbols containing at least one flexible symbol and/or at least one uplink symbol. And the fourth time domain unit may a slot or a mini-slot, which shall not be described herein any further.

In one implementation, the fourth indication information is a bitmap, each bit of the bitmap corresponding a fourth time domain unit. When a value of the bit is a first value (such as 1), it indicates that the fourth time domain unit belongs to the resource pool, and when a value of the bit is a second value (such as 0), it indicates that the fourth time domain unit does not belong to the resource pool. A length of the bitmap may be determined as demanded, the at least one fourth time domain unit may be cyclically indicated according to the bitmap; for example, the length of the bitmap is 6, and logical indices of the fourth time domain unit are 0, 1, . . . , I, . . . , respectively; wherein the bitmap may cyclically indicate 0th to 5th fourth time domain units, and 6th to 11th time domain unit, and so on. For example, when the bitmap is 110101, a fourth time domain unit with indices mod 6-0, 1, 3, 5 belongs to the resource pool. It should be noted that as the fourth time domain unit is a time domain unit containing U and/or X and hopping is performed on time domain units only containing D, the indices of the fourth time domain unit here are not necessarily consistent with its physical indices, but are indices reordered logically.

In one implementation, the fourth indication information may indicate in a manner of starting position+length, that is, the fourth indication information indicates a starting position and a length of the fourth time domain unit belonging to the resource pool, the starting position being denoted by a logical index of the fourth time domain unit, and the length being denoted by the number of fourth time domain units. The fourth time domain units of these numbers may be physically continuous or discontinuous, but the indices are continuous logically.

In this embodiment, identical or different fourth indication information may be used to indicate fourth time domain units in the fourth time domain units belonging to the resource pool configured by the cell-level configuration information and the UE-specific-level configuration information, respectively, and reference may be made to the first indication information in Embodiment 1 for particular implementation, which shall not be described herein any further.

In this embodiment, the fourth indication information in step 601 may be carried by a new information element, or may be carried by an original information element. The fourth indication information and the semi-persistent configuration information may be transmitted together, or may be transmitted separately, and this embodiment is not limited thereto.

In this embodiment, after step 601, the method may further include step 601': the terminal equipment receives, the dynamic resource indication information transmitted by the network device. The terminal equipment re-determines the resources in the resource pool according to the dynamic resource indication information; wherein the terminal equipment determines that downlink symbols or downlink and flexible symbols in the fourth time domain units belonging to the resource pool after being indicated by the dynamic resource indication information are not included in the resource pool, wherein the downlink symbols or downlink+ flexible symbols in the fourth time domain units belonging to the resource pool after being indicated by the dynamic resource indication information may be D or D+X configured by the dynamic resource indication information, and/or D or D+X originally configured by the semi-persistent configuration information.

For example, the dynamic resource indication information is used to configure transmission direction types of symbols in the resources with a transmission direction type being X remained after the former two levels of configuration (configuration by the semi-persistent configuration information); the transmission direction types include uplink, downlink and flexible, and the dynamic resource indication information may be of DCI format 2_0 in existing third-level configuration and is carried by a group common PDCCH; wherein as the DCI reconfigures the transmission direction types of the symbols in the resources with a transmission direction type being X remained after being configured by the semi-persistent configuration information, this part of resources with the transmission direction type being X may be indicated by the fourth indication information in step 601 as being included in the resource pool; however, after being reconfigured by the DCI, the transmission direction type may be modified into U or D. The terminal equipment needs to delete symbols from the resource pool which with a transmission direction of D or D+X in the fourth time domain units belonging to the resource pool after being reconfigured by the DCI. Or as the DCI reconfigures the transmission direction types of the symbols in the resources with a transmission direction type being X remained after being configured by the semi-persistent configuration information, this part of resources with the transmission direction type being X may be indicated by the fourth indication information in step 601 as being included in the resource pool; however, after being reconfigured by the DCI, the transmission direction type may still be X, the terminal equipment needs to delete the symbols from the resource pool which with the transmission direction type being X in the fourth time domain unit belonging to the resource pool after being reconfigured by the DCI from the resource pool; or, as the fourth time domain units belonging to the resource pool may possibly contain a part of symbols with a transmission direction type being D after being configured by the semi-persistent configuration information and the DCI does not change the transmission direction type of this part of symbols with the transmission direction type indicated as being D, the terminal equipment needs to delete this part of symbols from the resource pool which with the transmission direction type being still D (that is, their transmission direction type is originally configured by the semi-persistent configuration information) in the fourth time domain unit belonging to the resource pool after being reconfigured by the DCI. That is, the terminal equipment determines that downlink symbols or downlink and flexible symbols in the fourth time domain units belonging to the resource pool after being indicated by the dynamic resource indication information are not contained in the resource pool.

FIG. 7 is a schematic diagram of the indicated resources in this implementation, which shall be described by taking that the fourth time domain unit is a slot as an example. As shown in FIG. 7, for former two slots in the period, only D symbols are included, hence, the bitmap does not act on the former two slots. And for latter five slots, the bitmap of the fourth indication information is indicated as 110101, meaning that logically first to second, fourth and sixth (physically third, fourth, sixth and eighth) in a slot containing U and/or X belong to the resource pool. For example, for the physically third slot, after being configured by the DCI, a transmission direction type of its symbols with an original transmission direction type being X is modified into D. Thus, even though this part of symbols is indicated by the fourth indication information as being contained in the resource pool (bit 1 to which the bitmap corresponds), it is needed to delete this part of symbols with the transmission direction types being D (or D+X) from the resource pool, that is, the final resource pool does not contain this part of symbols with the transmission direction types being D (or D+X).

In this embodiment, reference may be made to step 203 in Embodiment 1 for implementation of step 602, which shall not be described herein any further.

With the above embodiment, the fourth indication information indicates which time domain resources configured by the semi-persistent configuration information belong to the resource pool, and the symbols with the transmission direction types being D or D+X after being indicated by the dynamic resource indication information are deleted from the resource pool, and the V2X terminal equipment may use the resources in the resource pool to perform data transmission and reception, thereby supporting V2X communication in a future communication system.

Embodiment 4

FIG. 8 is a flowchart of the resource indication method of Embodiment 4, which is applicable to a terminal equipment side. As shown in FIG. 8, the method includes:

> step 801: a terminal equipment receives, first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; and
>
> step 802: the terminal equipment transceives data by using the first time domain resources in the resource pool.

In this embodiment, implementation of step 801 is identical to step 201 in Embodiment 1, reference may be made to Embodiment 1 for implementation of the first indication information, and reference may be made to step 203 in Embodiment 1 for implementation of step 802, which shall not be described herein any further.

With the above embodiment, by indicating by the first indication information which time domain resources configured by the semi-persistent configuration information belong to the resource pool, the V2X terminal equipment may use the resources in the resource pool to perform data transmission and reception, thereby supporting V2X communication in a future communication system.

How the terminal equipment determines the resources in the resource pool according to the indication information transmitted by the network device is described in embodiments 1-4. When the terminal equipment operates in an idle state or is out of coverage of a cell, it needs to be in synchronization with other terminal equipments to perform data transmission. Hence, transceiving terminal equipments need to synchronize transmission direction types of the time domain resources, which shall be described below with reference to Embodiment 5.

Embodiment 5

FIG. 9 is a flowchart of the resource indication method of Embodiment 5, which is applicable to a first terminal equipment side. As shown in FIG. 9, the method includes:

> step 901: a first terminal equipment receives, semi-persistent configuration information transmitted by a network device, or generates semi-persistent configuration information; wherein the semi-persistent configuration information is used to configure transmission direction types of the time domain resources, the transmission direction types including uplink, downlink, and flexible; and > step 902: the first terminal equipment transmits broadcast information to a second terminal equipment, the broadcast information including the semi-persistent configuration information.

In this embodiment, in step 901, reference may be made to Embodiment 1 for implementation of the semi-persistent configuration information, which shall not be described herein any further.

In this embodiment, in step 902, the broadcast information may be carried in a sidelink broadcast channel (S-PBCH), and the semi-persistent configuration information received in step 901 may be included in the broadcast information, so that the first terminal equipment and the second terminal equipment synchronize the transmission direction type of the time domain resources, including aligning a transmission resource pool of the first terminal equipment with a reception resource pool of the second terminal equipment according to the broadcast information and aligning a reception resource pool of the first terminal equipment with a transmission resource pool of the second terminal equipment, such that the first terminal equipment and the second terminal equipment have the same understanding of time-domain resource information (such as index), etc. After the synchronization, the second terminal equipment may use the time domain resource to receive data transmitted by the first terminal equipment, or transmit data to the first terminal equipment.

In this embodiment, a transmission direction type of sidelink S may be added into the transmission direction type configured by the semi-persistent configuration information. After receiving the broadcast information, the second terminal equipment may determine symbols with a type of S configured by the semi-persistent configuration information, and determine that their resource pool contains the above symbols of the above type of S and/or symbols with a transmission direction type of uplink in the second time domain units indicated by the first indication information in Embodiment 4, which may be used for sidelink communications.

In this embodiment, the first terminal equipment operates within coverage of a cell and is in an idle state or is not within the coverage of the cell.

With the above embodiment, the semi-persistent configuration information is contained in the broadcast information transmitted between the terminal equipments. Therefore, the transceiver terminal equipments may synchronize the transmission direction types of the time domain resources to perform data transmission.

Embodiment 6

This embodiment provides a resource indication method, which corresponds to the resource indication method at the terminal equipment side in Embodiment 1, with identical contents being not going to be described herein any further.

FIG. 10 is a flowchart of the resource indication method of Embodiment 6, which is applicable to a network device side. As shown in FIG. 10, the method includes:

> step 1001: a network device transmits first indication information used for indicating first time domain resources in a resource pool to a terminal equipment; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; and step 1002: the network device transmits second indication information used for dynamically indicating second time domain resources in the resource pool by the network device to the terminal equipment; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit.

In this embodiment, steps 1001 and 1002 correspond to steps 201 and 202 in Embodiment 1, and reference may be made to Embodiment 1 for the first indication information and the second indication information, the contents of which being incorporated herein, which shall not be described herein any further.

In this embodiment, the method may further include (not shown): the network device transmits the semi-persistent configuration information to the terminal equipment. Reference may be made to Embodiment 1 for the semi-persistent configuration information, which shall not be described herein any further.

With the above embodiment, by indicating by the first indication information which time domain resources configured by the semi-persistent configuration information belong to the resource pool and dynamically indicating the time domain resources in the resource pool by the second indication information, the V2X terminal equipment may use the resources in the resource pool to perform data transmission and reception, thereby supporting V2X communication in a future communication system.

Embodiment 7

This embodiment provides a resource indication method, which corresponds to the resource indication method at the terminal equipment side in Embodiment 2, with identical contents being not going to be described herein any further.

FIG. 11 is a flowchart of the resource indication method of Embodiment 7, which is applicable to a network device side. As shown in FIG. 11, the method includes:

step 1101: a network device transmits third indication information used for dynamically indicating time domain resources in a resource pool by to a terminal equipment.

In this embodiment, the method may further include:

step 1100 (optional): the network device transmits semi-persistent configuration information to the terminal equipment. Reference may be made to Embodiment 1 for the semi-persistent configuration information, the contents of which being incorporated herein, and being not going to be described herein any further.

In this embodiment, the third indication information is used to indicate time domain resources belonging to the resource pool in the fourth time domain resources; wherein the fourth time domain resource include at least one third time domain unit with a transmission direction type configured by the semi-persistent configuration information. The third indication information indicates that symbols with a transmission direction type being sidelink cover symbols with transmission direction types being uplink and/or flexible and/or downlink in the fourth time domain resources; alternatively, the third indication information indicates that symbols with a bit value of a first value cover symbols with transmission direction types being uplink and/or flexible and/or downlink in the fourth time domain resource, such as covering symbols with transmission direction types being flexible in the fourth time domain resource; alternatively, they may also cover symbols with transmission direction types being uplink+flexible in the fourth time domain resource, alternatively, they may also cover symbols with transmission direction types being uplink+downlink+flexible in the fourth time domain resource.

In this embodiment, step 1101 corresponds to step 501 in Embodiment 2, and reference may be made to Embodiment 2 for the third indication information, the contents of which being incorporated herein, which shall not be described herein any further.

With the above embodiment, the time domain resources in the resource pool are dynamically indicated by the third indication information, and the V2X terminal equipment may perform data transmission and reception by using the resources in the resource pool, thereby supporting V2X communication in a future communication system.

Embodiment 8

This embodiment provides a resource indication method, which corresponds to the resource indication method at the terminal equipment side in Embodiment 3, with identical contents being not going to be described herein any further.

FIG. 12 is a flowchart of the resource indication method of Embodiment 8, which is applicable to a network device side. As shown in FIG. 12, the method includes:

step 1201: a network device transmits fourth indication information used for indicating time domain resources in a resource pool to a terminal equipment;

wherein the fourth indication information is used for indicating a fourth time domain unit in at least one fourth time domain unit belonging to the resource pool, each fourth time domain unit containing at least one flexible symbol and/or at least one uplink symbol.

In this embodiment, step 1201 corresponds to step 601 in Embodiment 3, and reference may be made to Embodiment 3 for the fourth indication information, the contents of which being incorporated herein, which shall not be described herein any further.

In this embodiment, the method may further include:

step 1200 (optional): the network device transmits semi-persistent configuration information to the terminal equipment; reference may be made to Embodiment 3 for the semi-persistent configuration information, the contents of which being incorporated herein, which shall not be described herein any further; and step 1202 (optional): the network device transmits dynamic resource indication information to the terminal equipment; reference may be made to Embodiment 3 for the dynamic resource indication information, the contents of which being incorporated herein, which shall not be described herein any further.

With the above embodiment, the fourth indication information indicates which time domain resources configured by the semi-persistent configuration information belong to the resource pool, and the symbols with the transmission direction types being D or D+X after being indicated by the dynamic resource indication information are deleted from the resource pool, and the V2X terminal equipment may use the resources in the resource pool to perform data transmission and reception, thereby supporting V2X communication in a future communication system.

Embodiment 9

This embodiment provides a resource indication method, which corresponds to the resource indication method at the terminal equipment side in Embodiment 4, with identical contents being not going to be described herein any further.

FIG. 13 is a flowchart of the resource indication method of Embodiment 9, which is applicable to a network device side. As shown in FIG. 13, the method includes:

step 1301: a network device transmits first indication information used for indicating first time domain resources belonging to a resource pool to a terminal equipment; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol.

In this embodiment, step 1301 corresponds to step 801 in Embodiment 4, and reference may be made to Embodiment 4 for the first indication information, the contents of which being incorporated herein, which shall not be described herein any further.

In this embodiment, the method may further include:

step 1300 (optional): the network device transmits semi-persistent configuration information to the terminal equipment; reference may be made to Embodiment 1 for the semi-persistent configuration information, the contents of which being incorporated herein, which shall not be described herein any further With the above embodiment, by indicating by the first indication information which time domain resources configured by the semi-persistent configuration information belong to the resource pool, the V2X terminal equipment may use the resources in the resource pool to perform data transmission and reception, thereby supporting V2X communication in a future communication system.

Embodiment 10

This embodiment provides a resource indication method, which corresponds to the resource indication method at the first terminal equipment side in Embodiment 5, with identical contents being not going to be described herein any further.

FIG. 14 is a flowchart of the resource indication method of Embodiment 10, which is applicable to a second terminal equipment side. As shown in FIG. 14, the method includes:

step 1401: a second terminal equipment receives, broadcast information transmitted by a first terminal equipment; wherein the broadcast information includes semi-persistent configuration information, the semi-persistent configuration information being used for configuring transmission direction types of time domain resources; wherein the transmission direction types include uplink, downlink, and flexible; and step 1402: the second terminal equipment synchronizes the time domain resources according to the semi-persistent configuration information.

In this embodiment, step 1401 corresponds to step 902 in Embodiment 5, the transmission direction types may further include sidelink, and reference may be made to Embodiment 5 for the broadcast information, the contents of which being incorporated herein, which shall not be described herein any further.

In step 1402, the first terminal equipment and the second terminal equipment may align a transmission resource pool of the first terminal equipment with a reception resource pool of the second terminal equipment according to the broadcast information and align a reception resource pool of the first terminal equipment with a transmission resource pool of the second terminal equipment, such that the first terminal equipment and the second terminal equipment have the same understanding of time-domain resource information (such as index), etc. After the synchronization, the second terminal equipment may use the time domain resource to receive data transmitted by the first terminal equipment, or transmit data to the first terminal equipment.

In this embodiment, a transmission direction type of sidelink S may be added into the transmission direction type configured by the semi-persistent configuration information. After receiving the broadcast information, the second terminal equipment may determine symbols with a type of S configured by the semi-persistent configuration information, and determine that their resource pool contains the above symbols of the above type of S and symbols with a transmission direction type of uplink in time domain units configured or preconfigured by the network device, which may be used for sidelink communications.

With the above embodiment, the semi-persistent configuration information is contained in the broadcast information transmitted between the terminal equipments. Therefore, the transceiver terminal equipments may synchronize the transmission direction types of the time domain resources to perform data transmission.

Embodiment 11

This embodiment provides a resource indication apparatus. As a principle of the apparatus for solving problems is similar to that of the method in Embodiment 1, reference may be made to the implementation of the method in Embodiment 1 for implementation of this apparatus, with identical contents being going to be described herein any further.

FIG. 15 is a schematic diagram of the resource indication apparatus of Embodiment 11. As shown in FIG. 15, a resource indication apparatus 1500 includes:

a first receiving unit 1501 configured to receive first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol;

a second receiving unit 1502 configured to receive second indication information used for dynamically indicating second time domain resources belonging to the resource pool and transmitted by the network device; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit; and a first processing unit 1503 configured to transceive data by using the first time domain resources and/or the second time domain resources in the resource pool.

In this embodiment, reference may be made to steps 201-203 in Embodiment 1 for the first receiving unit 1501, second receiving unit 1502 and first processing unit 1503, the contents of which being incorporated herein, and shall not be described herein any further.

In this embodiment, the apparatus 1500 may further include (not shown, optional):

a third receiving unit configured to receive the semi-persistent configuration information transmitted by the network device, the semi-persistent configuration information being used for configuring transmission direction types of the time domain resources; wherein the transmission direction types include uplink, downlink, and flexible; and wherein the semi-persistent configuration information includes cell-level configuration information and/or UE-specific-level configuration information, reference may be made to Embodiment 1 for implementation thereof, which shall not be described herein any further.

With the above embodiment, by indicating by the first indication information which time domain resources configured by the semi-persistent configuration information belong to the resource pool and dynamically indicating the time domain resources in the resource pool by the second indication information, the V2X terminal equipment may use the resources in the resource pool to perform data transmission and reception, thereby supporting V2X communication in a future communication system.

Embodiment 12

This embodiment provides a resource indication apparatus. As a principle of the apparatus for solving problems is similar to that of the method in Embodiment 2, reference may be made to the implementation of the method in Embodiment 2 for implementation of this apparatus, with identical contents being going to be described herein any further.

FIG. 16 is a schematic diagram of the resource indication apparatus of Embodiment 12. As shown in FIG. 16, a resource indication apparatus 1600 includes:

a fourth receiving unit 1601 configured to receive third indication information used for dynamically indicating time domain resources in a resource pool and transmitted by a network device; and a second processing unit 1602 configured to transceive data by using the time domain resources in the resource pool.

In this embodiment, reference may be made to steps 501-502 in Embodiment 2 for the fourth receiving unit 1601 and second processing unit 1602, the contents of which being incorporated herein, and shall not be described herein any further.

In this embodiment, the apparatus 1600 may further include (not shown, optional):

a third receiving unit configured to receive the semi-persistent configuration information transmitted by the network device, the semi-persistent configuration information being used for configuring transmission direction types of the time domain resources; wherein the transmission direction types include uplink, downlink, and flexible; and wherein the semi-persistent configuration information includes cell-level configuration information and/or UE-specific-level configuration information, and reference may be made to Embodiment 1 for implementation thereof, which shall not be described herein any further.

With the above embodiment, the time domain resources in the resource pool are dynamically indicated by the third indication information, and the terminal equipment may perform data transmission and reception according to the time domain resources in the resource pool, thereby supporting V2X communication in a future communication system.

Embodiment 13

This embodiment provides a resource indication apparatus. As a principle of the apparatus for solving problems is similar to that of the method in Embodiment 3, reference may be made to the implementation of the method in Embodiment 3 for implementation of this apparatus, with identical contents being going to be described herein any further.

FIG. 17 is a schematic diagram of the resource indication apparatus of Embodiment 13. As shown in FIG. 17, a resource indication apparatus 1700 includes:

a fifth receiving unit 1701 configured to receive fourth indication information used for indicating time domain resources in a resource pool and transmitted by a network device; wherein the fourth indication information is used for indicating a fourth time domain unit in at least one fourth time domain unit belonging to the resource pool, each fourth time domain unit containing at least one flexible symbol and/or at least one uplink symbol; and a fourth processing unit 1702 configured to transceive data by using the time domain resources in the resource pool.

In this embodiment, reference may be made to steps 601-602 in Embodiment 3 for the fifth receiving unit 1701 and fourth processing unit 1702, the contents of which being incorporated herein, and shall not be described herein any further.

In this embodiment, the apparatus 1700 may further include (not shown, optional):

a third receiving unit configured to receive the semi-persistent configuration information transmitted by the network device, the semi-persistent configuration information being used for configuring transmission direction types of the time domain resources; wherein the transmission direction types include uplink, downlink, and flexible; and wherein the semi-persistent configuration information includes cell-level configuration information and/or UE-specific-level configuration information, and reference may be made to Embodiment 1 for implementation thereof, which shall not be described herein any further.

With the above embodiment, the fourth indication information indicates which time domain resources configured by the semi-persistent configuration information belong to the resource pool, and the symbols with the transmission direction types being D or D+X after being indicated by the dynamic resource indication information are deleted from the resource pool, and the V2X terminal equipment may use the resources in the resource pool to perform data transmission and reception, thereby supporting V2X communication in a future communication system.

Embodiment 14

This embodiment provides a resource indication apparatus. As a principle of the apparatus for solving problems is similar to that of the method in Embodiment 4, reference may be made to the implementation of the method in Embodiment 4 for implementation of this apparatus, with identical contents being going to be described herein any further.

FIG. 18 is a schematic diagram of the resource indication apparatus of Embodiment 14. As shown in FIG. 18, a resource indication apparatus 1800 includes:

a first receiving unit 1801 configured to receive first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; and a first processing unit 1802 configured to transceive data by using the first time domain resources in the resource pool.

In this embodiment, reference may be made to steps 801-802 in Embodiment 4 for the first receiving unit 1801 and first processing unit 1802, the contents of which being incorporated herein, and shall not be described herein any further.

With the above embodiment, by indicating by the first indication information which time domain resources configured by the semi-persistent configuration information belong to the resource pool, the V2X terminal equipment may use the resources in the resource pool to perform data transmission and reception, thereby supporting V2X communication in a future communication system.

Embodiment 15

This embodiment provides a resource indication apparatus. As a principle of the apparatus for solving problems is similar to that of the method in Embodiment 5, reference may be made to the implementation of the method in Embodiment 5 for implementation of this apparatus, with identical contents being going to be described herein any further.

FIG. 19 is a schematic diagram of the resource indication apparatus of Embodiment 15, the resource indication apparatus being configured in a first terminal equipment. As shown in FIG. 19, a resource indication apparatus 1900 includes:

a third processing unit 1901 configured to receive semi-persistent configuration information transmitted by a network device; wherein the semi-persistent configuration information is used to configure transmission direction types of the time domain resources, the transmission direction types including uplink, downlink, and flexible; and a first transmitting unit 1902 configured to transmit broadcast information to a second terminal equipment, the broadcast information including the semi-persistent configuration information.

In this embodiment, reference may be made to steps 901-902 in Embodiment 5 for the third processing unit 1901 and first transmitting unit 1902, the contents of which being incorporated herein, and shall not be described herein any further.

With the above embodiment, the semi-persistent configuration information is contained in the broadcast information transmitted between the terminal equipments. Therefore, the transceiver terminal equipments may synchronize the transmission direction types of the time domain resources to perform data transmission.

Embodiment 16

This embodiment provides a resource indication apparatus. As a principle of the apparatus for solving problems is similar to that of the method in Embodiment 10, reference may be made to the implementation of the method in Embodiment 10 for implementation of this apparatus, with identical contents being going to be described herein any further.

FIG. 20 is a schematic diagram of the resource indication apparatus of Embodiment 16, which is configured in a second terminal equipment. As shown in FIG. 20, a resource indication apparatus 2000 includes:

a sixth receiving unit 2001 configured to receive broadcast information transmitted by a first terminal equipment; wherein the broadcast information includes semi-persistent configuration information, the semi-persistent configuration information being used for configuring transmission direction types of time domain resources; wherein the transmission direction types include uplink, downlink, and flexible; and a fourth processing unit 2002 configured to synchronize the time domain resources according to the semi-persistent configuration information.

In this embodiment, reference may be made to steps 1401-1402 in Embodiment 10 for the sixth receiving unit 2001 and fourth processing unit 2002, the contents of which being incorporated herein, and shall not be described herein any further.

With the above embodiment, the semi-persistent configuration information is contained in the broadcast information transmitted between the terminal equipments. Therefore, the transceiver terminal equipments may synchronize the transmission direction types of the time domain resources to perform data transmission.

Embodiment 17

This embodiment provides a resource indication apparatus. As a principle of the apparatus for solving problems is similar to those of the methods in embodiments 6-9, reference may be made to the implementations of the methods in embodiments 6-9 for implementation of this apparatus, with identical contents being going to be described herein any further.

FIG. 21 is a schematic diagram of the resource indication apparatus of Embodiment 17. As shown in FIG. 21, a resource indication apparatus 2100 includes: a second transmitting unit 2101.

In one implementation, the second transmitting unit 2101 is configured to transmit first indication information and second indication information to a terminal equipment, and reference may be made to steps 1001-1002 in Embodiment 6 for implementation thereof, which shall not be described herein any further.

In one implementation, the second transmitting unit 2101 is configured to transmit third indication information to the terminal equipment, and reference may be made to step 1101 in Embodiment 7 for implementation thereof, which shall not be described herein any further.

In one implementation, the second transmitting unit 2101 is configured to transmit fourth indication information to the terminal equipment, and reference may be made to step 1201 in Embodiment 8 for implementation thereof, which shall not be described herein any further.

In one implementation, the second transmitting unit 2101 is configured to transmit first indication information to the terminal equipment, and reference may be made to step 1301 in Embodiment 9 for implementation thereof, which shall not be described herein any further.

In this embodiment, the apparatus may further include a third transmitting unit (optional, not shown) configured to transmit semi-persistent configuration information to the terminal equipment, and reference may be made to Embodiment 1 for implementation thereof, which shall not be described herein any further.

With the above embodiment, by indicating by the indication information which time domain resources in the time domain resources that are semi-persistently configured and/or dynamically configured may be contained in the resource pool, the V2X terminal equipment may use the resources in the resource pool to perform data transmission and reception, thereby supporting V2X communication in a future communication system.

Embodiment 18

This embodiment provides a communication system, and reference may be made to FIG. 1, with contents identical to those in embodiments 1-10 being not going to be described herein any further. In this embodiment, the communication system 100 may include:

a network device 101 configured to transmit first indication information or second indication information or third indication information or fourth indication information; and a terminal equipment 102 configured with the resource indication apparatus 1500 or 1600 or 1700 or 1800 or 1900 or 2000 as described in any one of embodiments 11-16.

FIG. 22 is a flowchart of the resource indication method of this embodiment. As shown in FIG. 22, the method includes:

step 2201: the network device transmits semi-persistent configuration information to a first terminal equipment;

step 2202: the network device transmits indication information (in a form of bitmap, for example) to the first terminal equipment, the indication information being the first indication information in Embodiment 1 or the fourth indication information in Embodiment 3;

step 2203: the network device transmits downlink control information to the first terminal equipment, the downlink control information including the second indication information in Embodiment 1, or the third indication information in Embodiment 2, or the dynamic resource indication information in Embodiment 3;

step 2204: the first terminal equipment determines time domain resources in a resource pool according to the received indication information and downlink control information;

in this embodiment, step 2202 is optional, and the first terminal equipment may determine the time domain resources in the resource pool according only to indication information in the downlink control information; steps 2201 and 2202 may be executed sequentially, or may be executed simultaneously, or step 2202 may be executed first, then step 2201 is executed, and this embodiment is not limited thereto;

step 2205: the first terminal equipment transmits data to a second terminal equipment by using the resources in the resource pool, or receives data transmitted by the second terminal equipment; wherein the first terminal equipment may perform data transmission and reception by either using resources in the resource pool scheduled by the network device, or using resources in the resource pool selected by itself.

Alternatively, before transceiving the data, the method further includes (not shown): the first terminal equipment transmits broadcast information to the second terminal equipment. The broadcast information includes semi-persistent configuration information, and the second terminal equipment performs synchronization after receiving the broadcast information.

The embodiment of this disclosure further provides a terminal equipment, however, this disclosure is not limited thereto, and it may also be another equipment.

FIG. 23 is a schematic diagram of the terminal equipment (such as a V2X UE) of the embodiment of this disclosure. As shown in FIG. 23, a terminal equipment 2300 may include a processor 2310 and a memory 2320, the memory 2320 storing data and a program and being coupled to the processor 2310. It should be noted that his figure is illustrative only, and other types of structures may also be used, so as to supplement or replace this structure and achieve a telecommunications function or other functions.

For example, the processor 2310 may be configured to execute a program to carry out the resource indication method as described in embodiment 1. For example, the processor 2310 may be configured to execute the following control: receiving first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; receiving, second indication information used for dynamically indicating second time domain resources belonging to the resource pool and transmitted by the network device; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit;

and transceiving data by using the first time domain resources and/or the second time domain resources in the resource pool.

For example, the processor 2310 may be configured to execute a program to carry out the resource indication method as described in embodiment 2. For example, the processor 2310 may be configured to execute the following control: receiving third indication information used for dynamically indicating time domain resources in a resource pool and transmitted by a network device; and transceiving data by using the time domain resources in the resource pool.

For example, the processor 2310 may be configured to execute a program to carry out the resource indication method as described in embodiment 3. For example, the processor 2310 may be configured to execute the following control: receiving fourth indication information used for indicating time domain resources in a resource pool and transmitted by a network device; wherein the fourth indication information is used for indicating a fourth time domain unit in at least one fourth time domain unit belonging to the resource pool, each fourth time domain unit containing at least one flexible symbol and/or at least one uplink symbol; and transceiving data by using the time domain resources in the resource pool.

For example, the processor 2310 may be configured to execute a program to carry out the resource indication method as described in embodiment 4. For example, the processor 2310 may be configured to execute the following control: receiving first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; and transceiving data by using the first time domain resources in the resource pool.

For example, the processor 2310 may be configured to execute a program to carry out the resource indication method as described in embodiment 5. For example, the processor 2310 may be configured to execute the following control: receiving semi-persistent configuration information transmitted by a network device, or generating semi-persistent configuration information; wherein the semi-persistent configuration information is used to configure transmission direction types of the time domain resources, the transmission direction types including uplink, downlink, and flexible; and transmitting broadcast information to a second terminal equipment, the broadcast information including the semi-persistent configuration information.

For example, the processor 2310 may be configured to execute a program to carry out the resource indication method as described in embodiment 10. For example, the processor 2310 may be configured to execute the following control: receiving broadcast information transmitted by a first terminal equipment; wherein the broadcast information includes semi-persistent configuration information, the semi-persistent configuration information being used for configuring transmission direction types of time domain resources; wherein the transmission direction types include uplink, downlink, and flexible; and synchronizing the time domain resources according to the semi-persistent configuration information.

As shown in FIG. 23, the terminal equipment 2300 may further include a communication module 2330, an input unit 2340, a display 2350, and a power supply 2360; wherein functions of the above components are similar to those in the related art, which shall not be described herein any further. It should be noted that the terminal equipment 2300 does not necessarily include all the parts shown in FIG. 23, and the above components are not necessary. Furthermore, the terminal equipment 2300 may include parts not shown in FIG. 23, and the related art may be referred to.

The embodiment of this disclosure further provides a network device, which may be, for example, a base station. However, this disclosure is not limited thereto, and it may also be another network device.

FIG. 24 is a schematic diagram of a structure of the network device of the embodiment of this disclosure. As shown in FIG. 24, a network device 2400 may include a processor 2410 (such as a central processing unit (CPU)) and a memory 2420, the memory 2420 being coupled to the processor 2410. The memory 2420 may store various data, and furthermore, it may store a program 2430 for data processing, and execute the program 2430 under control of the processor 2410.

For example, the processor 2410 may be configured to execute the program 2430 to carry out the resource indication method as described in embodiment 6. For example, the processor 2410 may be configured to execute the following control: transmitting first indication information used for indicating first time domain resources in a resource pool to a terminal equipment; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; and transmitting second indication information used for dynamically indicating second time domain resources in the resource pool to the terminal equipment; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit.

For example, the processor 2410 may be configured to execute the program 2430 to carry out the resource indication method as described in embodiment 7. For example, the processor 2410 may be configured to execute the following control: transmitting third indication information used for dynamically indicating time domain resources in a resource pool to a terminal equipment.

For example, the processor 2410 may be configured to execute the program 2430 to carry out the resource indication method as described in embodiment 8. For example, the processor 2410 may be configured to execute the following control: transmitting fourth indication information used for indicating time domain resources in a resource pool to a terminal equipment; wherein the fourth indication information is used for indicating a fourth time domain unit in at least one fourth time domain unit belonging to the resource pool, each fourth time domain unit containing at least one flexible symbol and/or at least one uplink symbol.

For example, the processor 2410 may be configured to execute the program 2430 to carry out the resource indication method as described in embodiment 9. For example, the processor 2410 may be configured to execute the following control: transmitting first indication information used for indicating first time domain resources belonging to a resource pool to a terminal equipment; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol.

Furthermore, as shown in FIG. 24, the network device 2400 may include a transceiver 2440, and an antenna 2450, etc. Functions of the above components are similar to those in the related art, and shall not be described herein any further. It should be noted that the network device 2400 does not necessarily include all the parts shown in FIG. 24, and furthermore, the network device 2400 may include parts not shown in FIG. 24, and the related art may be referred to.

An embodiment of this disclosure provides a computer storage medium, including a computer readable program, which will cause a resource indication apparatus or a terminal equipment to carry out the resource indication method as described in any one of embodiments 1-5 and 10.

An embodiment of this disclosure provides a computer readable program, which, when executed in a resource indication apparatus or a terminal equipment, will cause the resource indication apparatus or the terminal equipment to carry out the resource indication method as described in any one of embodiments 1-5 and 10.

An embodiment of this disclosure provides a computer storage medium, including a computer readable program, which will cause a resource indication apparatus or a network device to carry out the resource indication method as described in any one of embodiments 6-9.

An embodiment of this disclosure provides a computer readable program, which, when executed in a resource indication apparatus or a network device, will cause the resource indication apparatus or the network device to carry out the resource indication method as described in any one of embodiments 6-9.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. Different embodiments herein also relate to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 15-24 may either correspond to software modules of procedures of a computer program, or correspond to hardware modules. Such software modules may respectively correspond to the steps shown in FIGS. 2-14. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 15-24 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 2-9 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this invention. Various variants and modifications may be made by those skilled in the art according to the principle of this invention, and such variants and modifications fall within the scope of this invention.

SUPPLEMENTS

1. A resource indication method, including:
receiving, by a terminal equipment, first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol;
receiving, by the terminal equipment, second indication information used for dynamically indicating second time domain resources belonging to the resource pool and transmitted by the network device; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit; and transceiving data by the terminal equipment by using the first time domain resources and/or the second time domain resources in the resource pool.

2. The method according to supplement 1, wherein the time domain unit includes a first predetermined number of symbols, the first predetermined number of symbols being all uplink symbols.

3. The method according to supplement 1 or 2, wherein the first indication information is a bitmap, or the first indication information indicates a starting position and length of the at least one second time domain unit in one period.

4. The method according to any one of supplements 1-3, wherein the method further includes:

receiving, by the terminal equipment, the semi-persistent configuration information transmitted by the network device, the semi-persistent configuration information being used for configuring transmission direction types of the time domain resources; wherein the transmission direction types include uplink, downlink, and flexible; and wherein the semi-persistent configuration information includes cell-level configuration information and/ or UE-specific-level configuration information.

5. The method according to supplement 4, wherein identical or different first indication information is used to respectively indicate second time domain units configured by the cell-level configuration information and the UE-specific-level configuration information.

6. The method according to supplement 5, wherein when different first indication information is used, the numbers of symbols contained in the time domain units configured by the cell-level configuration information and the UE-specific-level configuration information are identical or different.

7. The method according to any one of supplements 1-6, wherein the second indication information is used to indicate transmission direction types of symbols in the third time domain resources; wherein the transmission direction types include uplink, downlink, flexible, and sidelink, third time domain resources with a transmission direction type of sidelink belonging to the resource pool.

8. The method according to any one of supplements 1-7, wherein the second indication information is contained in first downlink control information, a format of the first downlink control information being format 2_0, and the second indication information is first index information, the first index information being used to indicate one or at least two pieces of second index information, each piece of second index information being used to indicate a format of a time domain unit, the format of the time domain unit including a transmission direction type of each symbol in the time domain unit, and time domain resources with a transmission direction type of sidelink belonging to the resource pool; or the second indication information is contained in second downlink control information, and the second indication information is first index information, each piece of the first index information being used to indicate one or at least two pieces of second index information, each piece of second index information being used to indicate a bitmap, or each piece of second index information being used to indicate one or at least two bitmaps, and in the bitmaps, a time domain unit to which a bit value that is a first value corresponds belonging to the resource pool, and a time domain unit having a bit value that is a second value not belonging to the resource pool.

9. The method according to supplement 8, wherein the terminal equipment is further configured to, according to the second index information and a predetermined correspondence, determine the format or bitmap of the time domain unit indicated by the second index information; and wherein the correspondence denotes a correspondence between different second index information and the formats of time domain units.

10. The method according to supplement 9, wherein the correspondence is directed to a terminal equipment of the V2X.

11. The method according to any one of supplements 1-10, wherein uplink symbols and/or flexible symbols in the at least one remained time domain unit belong to the third time domain resources.

12. A resource indication method, including:

receiving, by a terminal equipment, third indication information used for dynamically indicating time domain resources in a resource pool and transmitted by a network device; and transceiving data by the terminal equipment by using the time domain resources in the resource pool.

13. The method according to supplement 12, wherein the third indication information is used for indicating time domain resources in fourth time domain resources belonging to the resource pool; and wherein the fourth time domain resources include at least one third time domain unit with a transmission direction type being configured by semi-persistent configuration information.

14. The method according to supplement 12 or 13, wherein the third indication information is contained in first downlink control information, a format of the first downlink control information being format 2_0, and the third indication information is first index information, the first index information being used to indicate one or at least two pieces of second index information, each piece of second index information being used to indicate a format of a time domain unit, the format of time domain unit including a transmission direction type of each symbol in the time domain unit, the transmission direction types including uplink, downlink, flexible, and sidelink, and fourth time domain resources with a transmission direction type of sidelink belonging to the resource pool.

15. The method according to supplement 12 or 13, wherein the third indication information is contained in second downlink control information, and the third indication information is first index information, each piece of the first index information being used to indicate one or at least two pieces of second index information, each piece of second index information being used to indicate a bitmap, or each piece of second index information being used to indicate one or at least two bitmaps, and in the bitmaps, a time domain unit to which a bit value that is a first value corresponds belonging to the resource pool, and a time domain unit having a bit value that is a second value not belonging to the resource pool.

16. The method according to supplement 14 or 15, wherein the terminal equipment is further configured to, according to the second index information and a predetermined correspondence, determine time domain resources belonging to the resource pool; and wherein the correspondence denotes a correspondence between different second index information and the format/bitmap of the time domain unit.

17. The method according to supplement 14 or 15, wherein the third indication information indicates that symbols with a transmission direction type of sidelink overrides symbols in the fourth time domain resources with transmission direction types of uplink and/or flexible and/or downlink; or the third indication information indicates that symbols with a bit value of a first value overrides symbols in the fourth time domain resources with transmission direction types of uplink and/or flexible and/or downlink.

18. A resource indication method, including:

receiving, by a first terminal equipment, semi-persistent configuration information transmitted by a network device, or generating semi-persistent configuration information; wherein the semi-persistent configuration information is used to configure transmission direction types of the time domain resources, the transmission direction types including uplink, downlink, and flexible; and transmitting broadcast information by the first terminal equipment to a second terminal equipment, the broadcast information including the semi-persistent configuration information.

19. The method according to supplement 18, wherein the transmission direction types further include sidelink.

20. The method according to supplement 18 or 19, wherein the first terminal equipment operates in a coverage area of a cell and is in an idle state, or is not in a coverage area of a cell.

21. A resource indication method, including:

transmitting first indication information used for indicating first time domain resources in a resource pool by a network device to a terminal equipment; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; and transmitting second indication information used for dynamically indicating second time domain resources in the resource pool by the network device to the terminal equipment; wherein the second indication information is used for indicating time domain resources in third time domain resources belonging to the resource pool; wherein the third time domain resources contain time domain resources of a transmission direction type being flexible remained after configuration is performed by the semi-persistent configuration information and/or at least one remained time domain unit other than the at least one second time domain unit in the at least one first time domain unit.

22. A resource indication method, including:

transmitting third indication information used for dynamically indicating time domain resources in a resource pool by a network device to a terminal equipment.

23. A resource indication method, including:

receiving, by a second terminal equipment, broadcast information transmitted by a first terminal equipment;

wherein the broadcast information includes semi-persistent configuration information, the semi-persistent configuration information being used for configuring transmission direction types of time domain resources; wherein the transmission direction types include uplink, downlink, and flexible; and synchronizing the time domain resources by the second terminal equipment according to the semi-persistent configuration information.

24. A resource indication method, including:

receiving, by a terminal equipment, first indication information used for indicating first time domain resources belonging to a resource pool and transmitted by a network device; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol; and transceiving data by the terminal equipment by using the first time domain resources in the resource pool.

25. The method according to supplement 24, wherein the time domain unit includes a first predetermined number of symbols, the first predetermined number of symbols being all uplink symbols.

26. The method according to supplement 24 or 25, wherein the first indication information is a bitmap, or the first indication information indicates a starting position and length of the at least one second time domain unit in one period.

27. The method according to supplement 24 or 25 or 26, wherein the method further includes:

receiving, by the terminal equipment, the semi-persistent configuration information transmitted by the network device, the semi-persistent configuration information being used for configuring transmission direction types of the time domain resources; wherein the transmission direction types include uplink, downlink, and flexible; and wherein the semi-persistent configuration information includes cell-level configuration information and/or UE-specific-level configuration information.

28. The method according to supplement 27, wherein identical or different first indication information is used to respectively indicate second time domain units configured by the cell-level configuration information and the UE-specific-level configuration information; and wherein when different first indication information is used, the numbers of symbols contained in the time domain units configured by the cell-level configuration information and the UE-specific-level configuration information are identical or different.

29. A resource indication method, including:

transmitting first indication information used for indicating first time domain resources in a resource pool by a network device to a terminal equipment; wherein the first indication information is used for indicating at least one second time domain unit in at least one first time domain unit, symbols in the at least one second time domain unit of a transmission direction type of uplink constituting the first time domain resources in the resource pool; and wherein the transmission direction type in the time domain unit is configured by semi-persistent configuration information, and each time domain unit contains at least one uplink symbol.

30. A resource indication method, including:

receiving, by a terminal equipment, fourth indication information used for indicating time domain resources in a resource pool and transmitted by a network device;

wherein the fourth indication information is used for indicating a fourth time domain unit in at least one fourth time domain unit belonging to the resource pool, each fourth time domain unit containing at least one flexible symbol and/or at least one uplink symbol;

and the terminal equipment transceives data by using the time domain resources in the resource pool.

31. The method according to supplement 30, wherein the method further includes:

determining by the terminal equipment that a downlink symbol, or downlink and flexible symbols, in the fourth time domain unit belonging to the resource pool indicated by dynamic resource indication information, are not contained in the resource pool.

32. The method according to supplement 30 or 31, wherein the at least one fourth time domain unit is a time domain resource with a transmission direction type being configured by semi-persistent configuration information.

33. The method according to supplement 30 or 31 or 32, wherein the fourth indication information is a bitmap, or the fourth indication information indicates a starting position and length of the fourth time domain unit belonging to the resource pool.

34. The method according to supplement 32 or 33, wherein the method further includes:

receiving, by the terminal equipment, the semi-persistent configuration information and/or the dynamic resource indication information transmitted by the network device.

35. A resource indication method, including:

transmitting fourth indication information used for indicating time domain resources in a resource pool by a network device to a terminal equipment;

wherein the fourth indication information is used for indicating a fourth time domain unit in at least one fourth time domain unit belonging to the resource pool, each fourth time domain unit containing at least one flexible symbol and/or at least one uplink symbol.

What is claimed is:

1. A communication apparatus, comprising:

a receiver configured to receive first indication information, the first indication information being used for indicating at least one time domain resource belonging to a resource pool used for sidelink transmission; and a transmitter configured to transmit sidelink data on uplink symbols in the at least one time domain resource belonging to the resource pool, wherein transmission directions of symbols in each of the at least one time domain resource are configured by semi-persistent configuration information, and the first indication information is relevant to a time domain resource that includes uplink symbols of a number more than or equal to a first predetermined number and the first indication information is irrelevant to a time domain resource that includes uplink symbols of a number not more than or less than the first predetermined number.

2. The communication apparatus according to claim 1, wherein the first indication information is a bitmap.

3. The communication apparatus according to claim 1, wherein the receiver is further configured to receive the semi-persistent configuration information transmitted by a network device, the semi-persistent configuration information being used for configuring transmission direction types of symbols in time domain resources, wherein the transmission direction types comprise uplink, downlink, and flexible.

4. The communication apparatus according to claim 3, wherein the first predetermined number of uplink symbols includes all the uplink symbols within a slot.

5. The communication apparatus according to claim 1, wherein the first indication information indicates the at least one time domain resource belonging to the resource pool such that the at least one time domain resource does not include downlink symbol(s) nor flexible symbol(s).

6. A communication apparatus comprising:

a transmitter configured to transmit first indication information, the first indication information being used for indicating at least one time domain resource belonging to a resource pool used for sidelink transmission; and a receiver configured to receive sidelink data on uplink symbols in the at least one time domain resource belonging to the resource pool, wherein transmission directions of symbols in each of the at least one time domain resource are configured by semi-persistent configuration information, and the first indication information is relevant to a time domain resource that includes uplink symbols of a number more than or equal to a first predetermined number and the first indication information is irrelevant to a time domain resource that includes uplink symbols of a number not more than or less than the first predetermined number.

* * * * *